(12) United States Patent
Valentino et al.

(10) Patent No.: US 12,311,987 B2
(45) Date of Patent: May 27, 2025

(54) SYSTEM AND METHOD FOR RAILROAD SNAPSHOT AND PLAYBACK

(71) Applicant: BNSF Railway Company, Fort Worth, TX (US)

(72) Inventors: John Valentino, Hurst, TX (US); Len Gagne, Haslet, TX (US)

(73) Assignee: BNSF Railway Company, Fort Worth, TX (US)

( * ) Notice: Subject to any disclaimer, the term of this patent is extended or adjusted under 35 U.S.C. 154(b) by 578 days.

(21) Appl. No.: 16/867,467

(22) Filed: May 5, 2020

(65) Prior Publication Data

US 2021/0094594 A1 Apr. 1, 2021

Related U.S. Application Data

(60) Provisional application No. 62/814,758, filed on Mar. 6, 2019.

(51) Int. Cl.
*B61L 15/00* (2006.01)
*G07C 5/00* (2006.01)
(Continued)

(52) U.S. Cl.
CPC ....... *B61L 15/0072* (2013.01); *B61L 15/0018* (2013.01); *G07C 5/008* (2013.01);
(Continued)

(58) Field of Classification Search
CPC .. B61L 15/00; B61L 15/0018; B61L 15/0027; B61L 15/0036; B61L 15/0072; B61L 15/0081; B61L 15/009; B61L 1/00; B61L 1/16; B61L 1/161; B61L 1/163; G07C 5/0841; G07C 5/085; G07C 5/0866; G07C 5/0891; G07C 5/008; G07C 5/02;
(Continued)

(56) References Cited

U.S. PATENT DOCUMENTS 5,836,529 A * 11/1998 Gibbs ................ B61L 27/14
701/19
5,947,423 A * 9/1999 Clifton ................ B61L 21/10
246/177

(Continued)

*Primary Examiner* — Russell Frejd
*Assistant Examiner* — Sara J Lewandroski
(74) *Attorney, Agent, or Firm* — Whitaker Chalk Swindle & Schwartz PLLC; Enrique Sanchez, Jr.; Bradley J. Birchfield

(57) ABSTRACT

A Railroad Snapshot and Playback System and Method is disclosed that can provide a messaging/communication infrastructure configured to generate and route current train related messages for multi-region train routing plans. The types of railroad data being tracked can be organized into one or more domains. A method for railroad snapshot playback can include receiving a plurality of events related to train movements in the rail system; creating a first snapshot that can include the plurality of the events, wherein a number of events in the first snapshot can be based on a snapshot increment; receiving a playback request for a playback state of the rail system; pulling a snapshot and events received after the snapshot based on the playback request; building a state of the rail system using the pulled snapshot and the pulled events; operating controls of the rail system based on the state of the rail system.

20 Claims, 29 Drawing Sheets

(51) Int. Cl.
*G07C 5/08* (2006.01)
*G06F 16/84* (2019.01)
*G06F 16/903* (2019.01)

(52) U.S. Cl.
CPC ........ *G07C 5/0841* (2013.01); *B61L 15/0094* (2024.01); *G06F 16/86* (2019.01); *G06F 16/90335* (2019.01)

(58) Field of Classification Search
CPC ... G07C 5/04; G07C 5/06; G07C 5/10; G07C 5/12; G06F 16/86; G06F 16/903; G06F 16/90335; G06F 16/90348; G06F 16/9035; G06F 2212/163; G06F 2212/46; G06F 2212/465
See application file for complete search history.

(56) References Cited

U.S. PATENT DOCUMENTS

| | | | | |
|---|---|---|---|---|
| 2013/0304349 A1* | 11/2013 | Davidson | ............... | G08G 1/202 |
| | | | | 701/99 |
| 2014/0088820 A1* | 3/2014 | Jericho | ................ | G07C 5/0825 |
| | | | | 701/465 |
| 2019/0258620 A1* | 8/2019 | Itado | ................... | G06F 16/2282 |

* cited by examiner

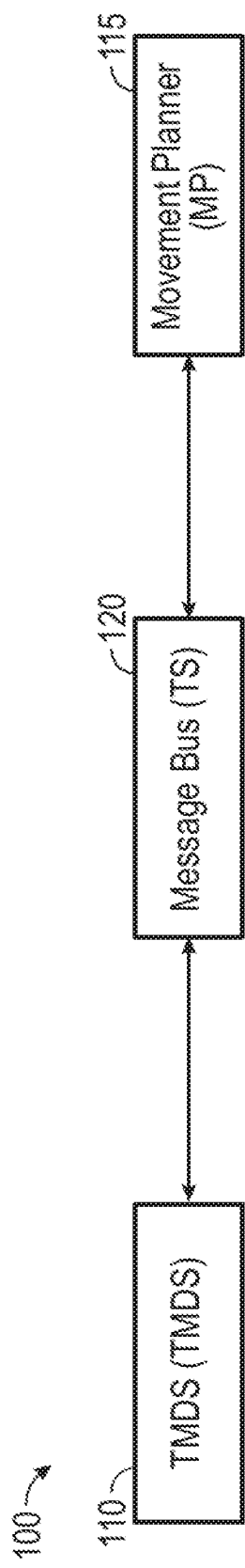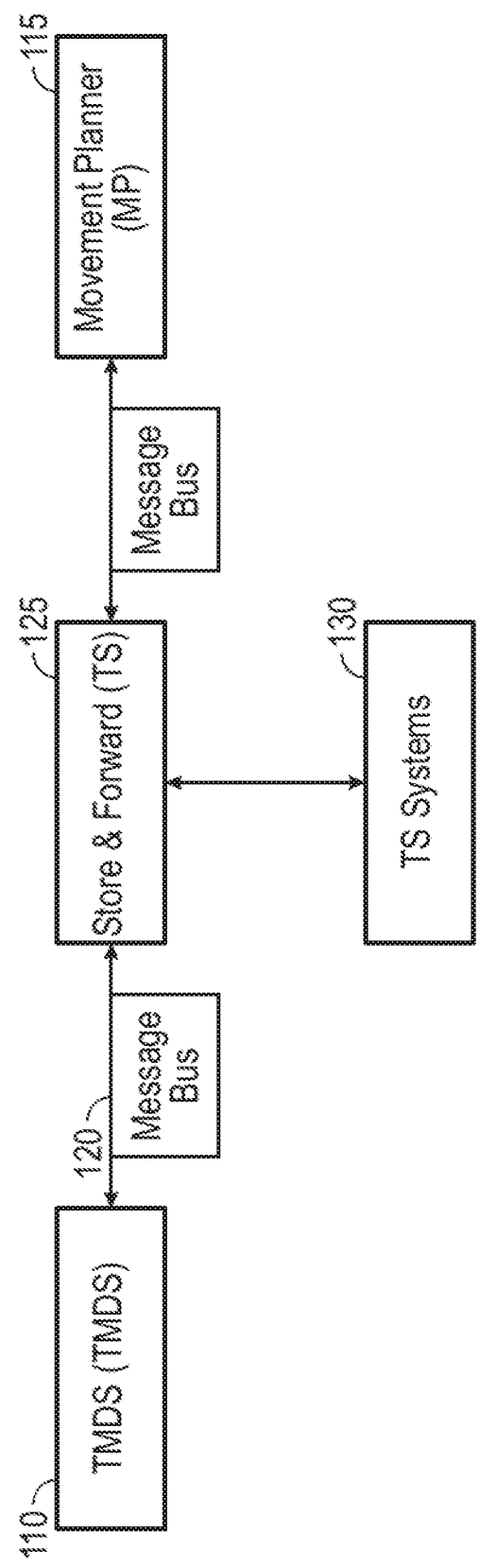

2400

2410
@T1 Train A moved from point 1 to 2

2412
@T2 Train A moved from point 2 to 3

2414
@T3 Train B moved from point 1 to 2

2416
@T4 Train A arrived at destination

2418
@T5 Train B moved from point 2 to 3

FIG. 24A

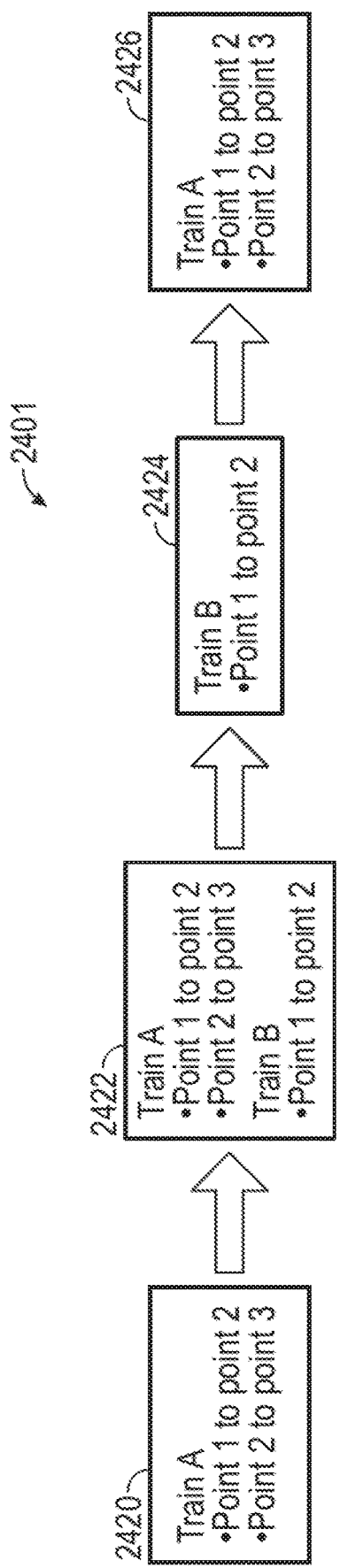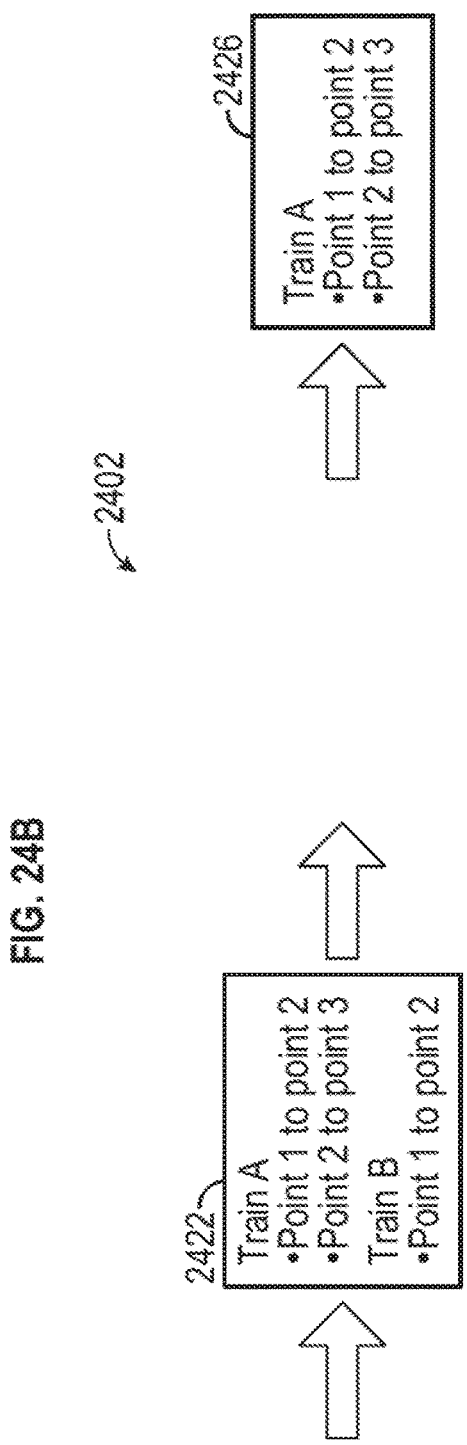
FIG. 24B
FIG. 24C

SYSTEM AND METHOD FOR RAILROAD SNAPSHOT AND PLAYBACK

CROSS REFERENCE TO RELATED APPLICATIONS

The present application claims priority to U.S. Provisional Application Ser. No. 62/814,758, naming the same inventors, was filed on Mar. 6, 2019, and entitled PLAYBACK AND SNAPSHOT API, the entirety of which can be incorporated herein by reference.

TECHNICAL FIELD

The present disclosure generally relates to railroad asset management and in particular to a playback and snapshot API.

BACKGROUND

Railroads are massive infrastructure environments with a network of millions of assets that need to function and move in a structured, orderly, deterministic manner. There can be millions of events per day associated with such assets. There are typically around 500,000 train moves per day, with approximately 5,000 trains moving over the infrastructure network at any given time. By way of example, if the system nominally processes 1,000,000 events per day and has been running for fifty days, 50,000,000 events would need to be processed to get the current system state. Processing 50,000,000 events would take an unreasonable amount of time.

SUMMARY

The present disclosure achieves technical advantages as a Railroad Snapshot and Playback System and Method that can provide a messaging/communication infrastructure configured to generate and route current train related messages for multi-region train routing plans. In one exemplary embodiment, the types of railroad data being tracked can be organized into one or more domains. For example, domain categories can include moves, schedules, constraints, crew, ARS, third party, and other relevant data categories.

In another exemplary embodiment, the state of the railroad can be periodically stored into one or more snapshots according to a specific domain and organized in a partitioned hierarchy. One object of the system can be to create and store a snapshot that can keep track of the differences between a previous railroad network state and a current one. The snapshot can provide a window in time, given a start time and an end time, for system playback, so a user does not have to review the entirety of snapshots from the beginning of the storage.

In another exemplary embodiment, the snapshot can include one or more events. For example, an event can be an immutable fact that cannot be changed or modified. Events can be stored in the system, and keyed by date/time. The system can store information into topics, where topics can contain unique partitions, and partitions can contain segments that contain the events. Another object of the system can be to replay (or Playback) all of the events necessary to represent the state as of a specific date/time. The current system state can include all information for any activity during a particular time frame.

The partitioning hierarchy organizes partitions within an individual topic. Each partition can represent a week's-worth of data, where events are keyed (e.g., organized) by date/time. The number of partitions for a topic are finite, and when the last partition can be reached data goes back to the first partition. Getting historical data out of the system can be accomplished via an Application Programming Interface (API). The API can include a library to simplify historical information retrieval from the system. Playback messages between a start time and an end time can utilize search functionality to return the events occurring between the two given times to a defined listener.

The present disclosure solves the technological problem of storing state information for a railroad network and its associated assets by periodically storing "snapshots" of massive amounts of transitory data associated with various railroad states and interpolating the snapshots to determine the state characteristic of assets in the railroad network at any point in time.

The present disclosure improves the performance of the system itself by partitioning and analyzing data according to predetermined hierarchies to retrieve railroad states without having to either filter through or query all of the events therein, and reduce the utilization of additional processing resources and network utilization from computationally-expensive data storage, data compression, and system queries.

Additionally, the present disclosure can generate and track analytics relevant to railroad assets and states for storage in an easily accessible data partition structure. In contrast, traditional systems simply cannot provide data windowing to identify data relevant to any point in time, but instead simply add to the strain on an already overspent system by storing certain data more frequently and compressing the data for storage and decompressing the data for access.

Advantageously, the present disclosure enhances the railroad state monitoring process by implementing algorithms that capture and organize various data to create a database of change data that can streamline analytic functionality for the railroad network and its associated assets. Importantly, the present disclosure can save an operator time, increase revenue, provide a platform for previously uncaptured data analytics, and identify areas for improvement.

In one example embodiment, an apparatus can provide for a playback and snapshot API. The apparatus can include at least one memory that stores events and snapshots related to the rail system and a processor coupled to the memory. The processor can receive a plurality of events related to train movements in the rail system; creates a snapshot that can include the plurality of the events, wherein a number of events in the snapshot corresponds to a number of events associated with trains that are still active; can receive a playback request for a state of the rail system; pulls the snapshot and subsequent events received after the snapshot based on the playback request; and queues the snapshot and the subsequent events for processing, wherein the pulled snapshot and the pulled subsequent events represent a state of the rail system.

In another example embodiment, a method can provide for a playback and snapshot API. The method can include receiving a plurality of events related to train movements in the rail system; creating a snapshot that can include the plurality of the events, wherein a number of events in the snapshot corresponds to a number of events associated with trains that are still active; receiving a request for a state of the rail system; pulling the snapshot and subsequent events received after the snapshot based on the request; queuing the pulled snapshot and the pulled subsequent events for processing, wherein the pulled snapshot and the pulled subsequent events represents the state of the rail system.

In another example embodiment, a non-transitory computer readable medium can provide for a playback and snapshot API. The non-transitory computer readable medium storing instructions that, when executed, causes a processor to receive a plurality of events related to train movements in the rail system; create a snapshot that can include the plurality of the events, wherein a number of events in the first snapshot corresponds to a number of events associated with trains that are still active; receive a request for a state of the rail system; pull the snapshot and the subsequent events received after the snapshot based on the request; queuing the pulled snapshot and the pulled subsequent events, wherein the pulled snapshot and the pulled subsequent events the state of the rail system.

BRIEF DESCRIPTION OF THE DRAWINGS

FIGS. 1A and 1B illustrate exemplary movement planner systems in accordance with one or more exemplary embodiments of the present disclosure;

FIGS. 24A-24E illustrate exemplary playback and snapshots in accordance with one or more exemplary embodiments of the present disclosure.

DETAILED DESCRIPTION OF THE INVENTION

Figure 2A:
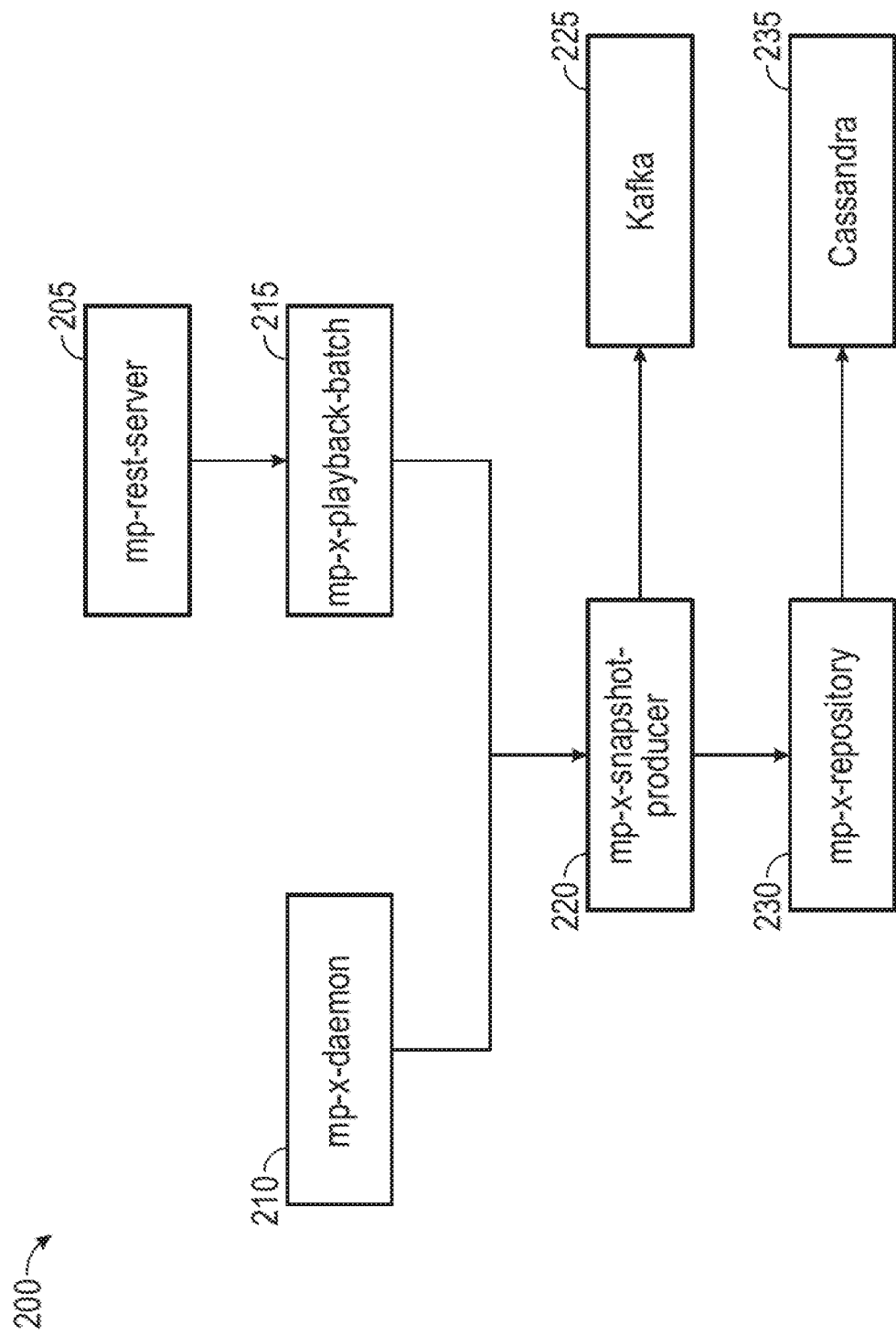
FIG. 2A illustrates an exemplary software component system in accordance with one or more exemplary embodiments of the present disclosure.

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

FIGS. 1A and 1B illustrate exemplary railroad planning systems 100, 105 in accordance with one or more exemplary embodiments of the present disclosure. FIG. 1A illustrates one exemplary embodiment of the railroad planning system 100, having a train management dispatch system (TMDS) 110, a movement planner (MP) 115, and a Technology Services (TS) message bus 120. The TMDS 110, MP 115, and message bus 120 can be implemented via one or more servers having a memory.

The server can be implemented in hardware, software, or a suitable combination of hardware and software therefor, and may comprise one or more software systems operating on one or more servers, having one or more processors, with access to memory. Server(s) can include electronic storage, one or more processors, and/or other components. Server(s) can include communication lines, or ports to enable the exchange of information with a network and/or other computing platforms. Server(s) can also include a plurality of hardware, software, and/or firmware components operating together to provide the functionality attributed herein to server(s). For example, server(s) can be implemented by a cloud of computing platforms operating together as server(s). Additionally, the server can include memory.

Memory can comprise electronic storage that can include non-transitory storage media that electronically stores information. The electronic storage media of electronic storage may include one or both of system storage that can be provided integrally (i.e., substantially non-removable) with server(s) and/or removable storage that can be removably connectable to server(s) via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store machine-readable instructions, software algorithms, information determined by processor(s), information received from server(s), information received from computing platform(s), and/or other information that enables server(s) to function as described herein. The electronic storage can also be accessible via a network connection.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information, such as FPGAs or ASICs. The processor(s) may be a single entity, or include a plurality of processing units. These processing units may be physically located within the same device, or processor(s) may represent processing functionality of a plurality of devices operating in coordination or software functionality.

The processor(s) can be configured to execute machine-readable instruction or learning modules by software, hardware, firmware, some combination of software, hardware, and/or firmware, and/or other mechanisms for configuring processing capabilities on processor(s). As used herein, the term "machine-readable instruction" may refer to any component or set of components that perform the functionality attributed to the machine-readable instruction component. This can include one or more physical processors during execution of processor readable instructions, the processor readable instructions, circuitry, hardware, storage media, or any other components.

The server can be configured with machine-readable instructions having one or more functional modules. The machine-readable instructions can be implemented on one or more servers, having one or more processors, with access to memory. The machine-readable instructions can be a single networked node, or a machine cluster, which can include a distributed architecture of a plurality of networked nodes. The machine-readable instructions can include control logic for implementing various functionality, as described in more detail below. The machine-readable instructions can include certain functionality associated with TMDS 110, MP 115, and Technology Services (TS) message bus 120.

FIG. 1B illustrates another exemplary embodiment of the railroad planning system 105, having a train management dispatch system (TMDS) 110, a movement planner (MP) 115, a message bus 120, a TS store & forward module 125, and TS systems 130. The TMDS 110, MP 115, TS message bus 120, TS store & forward module 125, and TS systems 130 can be implemented via one or more servers having a memory.

For the railroad planning systems 100 and 105, the format for messages transmitted to and from the systems 100 and 105 can include any format, including JavaScript Object Notation (JSON), TCP/IP, XML, HTML, ASCII, SMS, CSV, API, or other suitable format. Each message can consist of a message header, header properties, and a message body, or be encapsulated and packetized by any suitable format having same, including Representational state transfer (REST). The message transmission can be encrypted, unencrypted, over a VPN tunnel, or other suitable communication means. The systems 100 and 105 can be a connected via WAN, LAN, PAN, or other suitable network. The network communication between the wearable device 100 and the sever 306 can be encrypted using PGP, Blowfish, AES 3DES, HTTPS, or other suitable encryption. The systems 100, 105 can be configured to communicate with the various other systems and modules disclosed herein using Wi-Fi, Bluetooth, Ethernet, or other suitable communication protocol. Additionally, third part databases can be operably connected to the server via the Internet. The message header can be in the data type of a JSON string and can be describes assorted properties of the message used for filtering. The message body can be in the data type of a JSON string and contains the payload of the message.

The message header can include: Message Type, Date and Time that the message was sent, SHA512 signature for message body, Message ID (can be used to correlate the message with other messages), source of the message, destination of the message, auto-routing signal clear messages only, auto-routing signal clear messages only (version-based), and other suitable fields or data. Producer and consumer message buses may include additional header proprieties within an interface control document (ICD). If none of the consumers in a system chooses to use the undefined values, since the messaging format allows unspecified values to be attached to the header, the undefined values shall be ignored. It can be at the discretion of the consumer to determine what to do with the additional header properties. If any consumer chooses to use the additional header properties, then the header property must be defined within the ICD.

Optional header properties "MUST NOT" allow "id" or "timestamp" or anything that starts with "amqp_". These properties will not get to the intended consumer of the message if included and cannot be reliably transferred between message invocations within the header properties. The message type can include data associated with: message bus (MB), movement planner (MP), train management system (TMDS), mainframe system (TSS), computer aided dispatching (CAD), auto-routing system (ARS), and technology services (TS), or other suitable systems, modules, or data.

In one exemplary embodiment, the message types can be categorized into domains. For example, the Moves domain can include the MOVSYM and SYMOS message types; the Constraints domain can include the DEVBLK, SPDTAG, XNGTAG, TRKWAR, TRKTIM, FORMA, FORMB message types; the Crew domain can include the TRAINCREW and CREWSWAP message types; the Schedules domain can include the TRNSCH, HOTTRAIN, WOSUM, CONSISTD, and WANTTIME message types; and the ARS domain can include the ARSCFG, TRNARS, STKRTE, TUNNEL, LNKULK, TERASG, WKSYNC, RTEREQ, TRNPLN, CLRREQ, TRNRTE message types. The domains can be user configurable, such that different message types can be identified with one or more domains to provide the user with the data and granularity needed for a particular application. Although specific message types are indicated herein, any type of message or data transmission can be contemplated by this disclosure, and amenable to organization within one or more domains.

In another exemplary embodiment, train movement messages can be used to pass train movement information to between the TMDS 110 and the MP 115. For example, the move symbol (MOVSYM) message can be sent from the TMDS 110 to the MP 115. The MOVSYM message can be used to report a position change for a train (represented by a symbol) in the system. The symbol can be moving from one globally unique identifier (GUID) to another GUID on the system. The MOVSYM message can include data, such as: message version id; train symbol that moved; globally-unique ID of the source track; globally-unique ID of the destination track; train symbol direction of move (e.g., N, S, E, W); timetable direction of the current train sheet (e.g., N, S, E, W); position of the train in the stack on the "to" track; work station the train symbol moved to; type of move (e.g., "D" by disp, "T" by tracking, "I" by init, "R" for release); and timestamp of move.

In another exemplary embodiment, block constraint messages are messages that can convey restrictions to train movement. A switch block allows the switch to be used for the position the switch can be in, but cannot be lined to, a new position. A device block (DEVBLK) message can be sent from the TMDS to the MP. The DEVBLK message can be sent when a device block can be put on a device in the TMDS system. The device can be placed on a track, switch, or signal. The DEVBLK message can include data, such as: messageVersion; action; id (e.g., unique ID of block); effectiveDateTime; expectedReleaseDateTime; isPlanThrough; deviceGUID; switchPosition (e.g., switch can be in normal position, reverse position, unknown); deviceType (e.g., signal, track, unknown, don't care).

In another exemplary embodiment, speed restriction constraint messages can be used to convey details regarding areas of a track being operated under a reduced speed. A speed tag (SPDTAG) message can be sent from the TMDS to the MP. The SPDTAG message can be sent when a speed tag can be placed on a track or removed from a track in the TMDS. The SPDTAG message can also be sent from an initial request for tags. The SPDTAG message can include data, such as: messageVersion; action; tagType (e.g., speed, weather); Id (e.g., system unique number to identify tag); effectiveDateTime; expectedReleaseDateTime; freightSpeed (e.g., restriction); passengerSpeed (e.g., restriction); isRestrictive; restrictionDirection (e.g., N, S, E, W, both); restrictionSubdivision; fromMilepost; fromMilepostSuffix; toMilepost; toMilepostSuffix; placedBy (e.g., person placing restriction); dispatcherName; and trackGUID, among others.

In another exemplary embodiment, a crossing tag (XNGTAG) can be a speed restriction constraint message that can be sent when a crossing tag can be placed on a track or removed from a track in the dispatch system. The XNGTAG can be sent from the TMDS to the MP. The XNGTAG can also be sent from an initial request for tags or movement authority request when a tag can be for a specific train or set of trains. The XNGTAG message can include fields and data.

In another exemplary embodiment, an Authority Constraint Message can be used to convey details regarding specific segments of controlled track over which a train or maintenance crew has authority to occupy and move on a main track. A Track Warrant (TRKWAR) can be a type of authority constraint message that can be sent from the TMDS to the MP. The TRKWAR message can include fields and data.

In another exemplary embodiment, a track and time (TRKTIM) message can be an authority constraint message that can be sent when track and time can be placed on a track in the dispatch system. The TRKTIM can be sent from a TMDS to an MP. The TRKTIM can also be sent from a request or an init request for track and time. The TRKTIM message can include data, such as: AuthorityID; effective Date and Time; train symbol; trackGUID; and action, among others.

Examples of TMDS routing messages can include an ARS configuration (ARSCFG) message, a train ARS configuration (TRNARS) message, a stacked route (STKRTE) message, a tunnel (TUNNEL) message, a link/unlink (LNKULK) message, a territory assignment (TERASG) message, and a workstation sync (WKSYNC) message.

In accordance with various embodiments of the present disclosure, the ARSCFG message can be sent from a TMDS to an MP, and can include data, such as territory and can be AutoRoutable. The TRNARS message can be sent from a TMDS to an MP and can include data, such as TrainSymbol, among others. The STKRTE message can be sent from a TMDS to an MP and can include data, such as a unique identifier of a pre-defined route segment, among others. The TUNNEL message can be sent from a TMDS to an MP and can include data, such as: TunnelName and FlushDuration, among others. The LNKULK message can be sent from a TMDS to an MP and can include data, such as: train that can be tracked or train that goes away, among others. The TERASG message can be sent from a TMDS to an MP and can include data, such as: territories loaded and territory GUID, among others. The WKSYNC message can be sent from a TMDS to an MP and can include data, such as: TerritoryID and TerritoryVersion, among others.

Examples of movement planner routing messages can include a route clear request (CLRREQ) message, a route clear status (CLRSTS) message, a train route request (RTEREQ) message, a train route (TRNRTE) message, a train plan (TRNPLN) message, among others.

In one exemplary embodiment, an MP can determine trip plans for all trains though the day of operations. The MP can generate routes for trains in accordance with the current trip plan. The CLRREQ message can be a movement planner routing message that requests a portion of the planned route to be "fired" to move the train in accordance with the current trip plan. The CLRREQ message can be sent from an MP to a TMDS. The CLRREQ message can include data, such as: message version id; correlation id for the request; Date and Time when the request was generated; identifier of the train the route can be being requested for; the specific day the train was scheduled to start its trip; the unique identifier of a pre-defined route segment; the exact point on the track identified as milepost (or kilometer post) that was last reported to MP; a value used to disambiguate parallel tracks with the same milepost; and a value used to disambiguate milepost/kilometer post ranges, among others.

In another exemplary embodiment, the CLRSTS message can be a movement planner routing message that can be used to notify the MP of the current execution status of a route clear request previously sent by the MP, and can provide route clear status based upon dispatcher action, field device status, and train movement. The CLRSTS message can be sent from a TMDS to an MP.

In another exemplary embodiment, if requestStatus=C and requestID can be NOT blank in a response to the MP, the MP can auto route the signal. If requestStatus=C and requestID can be blank, then trainSymbol can be not required (e.g., when dispatcher aligns a signal without a train association, a stacked route executes, unsolicited field signal clear). The MP can re-request the route. If requestStatus=R when route clear request can be received and processed and there can be a restrictive tag warning where user input can be pending (e.g., if dispatcher has lined the same route, TMDS should not send a requestStatus=R, should be C when dispatcher has approved the restrictive warning, should be F when dispatcher has rejected the restrictive warning when request route request clear was received). The MP may not auto route the routeID. The MP can wait a configurable period (e.g., default 90 seconds or other suitable time period) before requesting signal again, unless a C or F can be received during that time period. If requestStatus=S, then requestID can be not required (e.g., if it was dispatcher initialed, then the signal can be set to manual). If a train slots the signal, requestStatus=S can be sent. The MP can treat it as F and continue to re-request the route. If set to manual by dispatcher, the MP can set as manual. If requestStatus=F, then all fields are required. The MP can treat it as F and continue to re-request the route. If requestStatus=P, then requestID can be not required, trainSymbol & routeID are required. The MP can treat it as cleared. If requestStatus=E, then clearableRouteID can equal the enter track GUID i.e., not a route ID, trainSymbol can be required. The MP can treat it as cleared. If requestStatus=L, then clearableRouteID can be required (e.g., for every time a fleeting signal goes green, this message can be sent; when fleeting can be turned on/off, a separate message can be sent). The MP may take no action for this status. This status message can be followed by ARSCFG changing routeID to manual. If requestStatus=D, then clearableRouteID can be required. The MP may take no action for this status. This status message can be followed by ARSCFG changing routeID to manual. The CLRSTS message can include data, such as: request Date and Time, train symbol, scheduled departure Date and Time, among others.

In another exemplary embodiment, the RTEREQ message can be a movement planner routing message that allows the user to retrieve the currently planned rout of a train. The RTEREQ can be used to show a train trace on a dispatch workstation. The RTEREQ message can be sent from an MP to a TMDS. The RTEREQ message can include data, such as: message version id; correlation id to be associated; Date and Time when the request was generated; identification of the train the route can be being requested, among others.

The TRNRTE message can be a movement planner routing message that can provide the currently planned route of a train, if available. The TRNRTE message can be returned in response to the train route request. The TRNRTE message can be sent from a TS to an MP. The TRNRTE message can include data, such as: identification of the train the route can be being requested for; the specific day the train was scheduled to start its trip; and part of the planned route of the train, among others.

The TRNPLN message can be a movement planner routing message that can provide the current movement plan for a single train. The TRNPLN can be sent to the domain message bus unsolicited as new plans are created. The TRNPLN message can be sent from an MP to a TS. The TRNPLN message can include data, such as: plan id to be an unique number associated with each set of train plans; identification of the train the route can be being requested for; the specific day the train was scheduled to start its trip; the unique identifier of this activity within the movement plan; and the planning status of the activity, among others.

In another exemplary embodiment, examples of TSS messages include a hot train (HOTTRAIN) message, a train schedule (TRNSCH) message, a want time (WANTTIME) message, a word order summary (WOSUM) message, a consistD (CONSISTD) message, a form A restriction (FORMA) message, a form B restriction (FORMB) message, a crew planning (TRAINCREW) message, and a crew swap (CREWSWAP) message.

The HOTTRAIN message can be a TSS message that can be generated as a result of a hot train input. The HOTTRAIN message can be sent from a TS to an MP. The HOTTRAIN message can include data, such as: version of message; train symbol; and action, among others.

The TRNSCH message can be a TSS message that can be a train schedule with changes from the MP. The TRNSCH message may not be passed to other systems. The TRNSCH message can be sent from a TS to an MP. The TRNSCH message can include data, such as: schedule departure Date and Time; origin station; origin state; destination station; destination state; origin maximum speed; inspection required; refuel activity; estimated loads; estimated gross tons; estimated train trailing length outbound at station; and current station sequence number, among others.

The WANTTIME message can be a TSS message that can be generated as a result of YDS, TRNBRO or other TSS application user inputs. The WANTTIME message can be sent from a TS to an MP. The WANTTIME message can include data, such as: train symbol; station sequence number; want Date and Time; and want TrackGUID, among others.

The WOSUM message can be a TSS message that can be generated at a word order print time from the TSS. The WOSUM message can be sent from a TS to an MP. The WOSUM message can include data, such as: station sequence number; axel count; equipment ID; car kind; horse power; weight; HAZMAT; and length in feet, among others.

The CONSISTD message can be a TSS message that can be generated when a train consist can be created or changed on the mainframe. The CONSISTD message can be sent from a TS to an MP. The CONSISTD message can include data, such as: action; train symbol; station; station state; station sequence number; and tons per operating brake, among others.

The FORMA message can be a TSS message can be sent from a TS to an MP. The FORMA message can include data, such as: from milepost; from milepost suffix; to milepost; to milepost suffix; freight maximum speed; passenger maximum speed; authorizing name; estimated removal Date and Time; and track name, among others.

The FORMB message can be a TSS message can be sent from a TS to an MP. The FORMB message can include data, such as: from milepost; from milepost suffix; to milepost; to milepost suffix; effective Date and Time; release Date and Time; and foreman name; among others.

The TRAINCREW message can be a TSS message can be sent from a TS to an MP. The TRAINCREW message can include data, such as: action; train symbol; from station; from station; to station; to station; on train symbol; crew name; call Date and Time; on duty Date and Time; and off duty Date and Time, among others.

The CREWSWAP message can be a TSS message can be sent from an MP to a TS. The CREWSWAP message can include data, such as: swap to train symbol; swap from train symbol; swap milepost; subdivision; station; on duty Date and Time; off duty Date and Time; and crew name, among others.

In another exemplary embodiment, examples of error messages include a TS error (TSERR) message, a TMDS error (TMDSERR) message, and an MP error (MPERR) message. The TSERR message can be an error message can be sent to a TS. The TSERR message can include data, such as: error code; description; and JSON representation of the message sent including header properties and body, among others.

The TMDSERR message can be an error message can be sent to a TS. The TMDSERR message can include data, such as: error code; description; and JSON representation of the message sent including header properties and body, among others.

The MPERR message can be an error message can be sent to an MP. The MPERR message can include data, such as: error code; description; and JSON representation of the message sent including header properties and body, among others.

In another exemplary embodiment, a number of failure reasons can be applied to the TSERR, the TMDSER, and the MPERR messages, such as: Track and Time exists within requested route; device block exists within requested route; occupancy exists within requested route; conflicting route exists within requested route; stored route exists within requested route; code brown failure within requested route; remote link down within requested route; location in manual for requested route; traffic can be stuck for requested route; non-controllable signal for requested route; signal location and drill mode for requested route; signal location and fleet mode for requested route; signal route not found; signal for route already cleared; signal in time for requested route; definition of Signal Route does not include all necessary components; switch could not be placed in the requested position; denied by the Dispatcher for restrictive tag prompt; and opposing traffic exists for requested route, among others.

FIG. 2A illustrates an exemplary software component system 200 in accordance with one or more exemplary embodiments of the present disclosure. The software component system 200 can provide for a playback and snapshots of a rail system. The software component system 200 can include an mp-rest-server application 205, an mp-x-daemon application 210, an mp-x-playback-batch application 215, an mp-x-snapshot-producer library 220, a Kafka infrastructure 225, an mp-x-repository library 230, and a Cassandra infrastructure 235.

The mp-rest-server application 205, mp-x-daemon application 210, and mp-x-playback-batch application 215 can be implemented in control logic, an algorithm on a server, a machine learning module, or other suitable system. The mp-rest-server application 205, mp-x-daemon application 210, and mp-x-playback-batch application 215 can be implemented with software, hardware, an application programming interface (API), a network connection, a network transfer protocol, HTML, DHTML, JavaScript, Dojo, Ruby, Rails, other suitable applications, or any suitable combination thereof.

The mp-rest-server application 205, mp-x-daemon application 210, and mp-x-playback-batch application 215 can leverage the ability of a computer platform to spawn multiple processes and threads by processing data simultaneously. The speed and efficiency of the mp-rest-server application 205, mp-x-daemon application 210, and mp-x-playback-batch application 215 can be greatly improved by instantiating more than one process to generate data for analysis or storage in the mp-x-snapshot-producer library 220 and mp-x-repository library 230. However, one skilled in the art of programming will appreciate that use of a single processing thread may also be utilized and can be within the scope of the present disclosure.

The Kafka infrastructure 225 can store and process events related to the railroad network and associated assets. Apache Kafka® can be a durable message broker that enables applications to process, persist, and re-process streamed data and can provide a unified, high-throughput, low-latency platform for handling real-time data feeds. The Kafka infrastructure 225 can be implemented on a server with internal or external memory, with Apache Kafka or other suitable data feed processing software. The Kafka infrastructure 225 can store information in topics, where topics contain numbered partitions, and partitions contain segments that contain the actual events.

The Cassandra infrastructure 235 can store and process snapshots related to the railroad network and related assets. The Cassandra infrastructure 235 can be implemented on a server with internal or external memory. The Cassandra infrastructure 235 can include a database, such as a SQL database, Oracle database, or other suitable database. The Cassandra infrastructure 235 can include one or more tables that can maintain train-specific information for specific trains by train symbol, for each snapshot. The Cassandra infrastructure 235 can keep track of the individual snapshots by storing data, such as: a representation of the date/time for a snapshot; ISO 8601 String representation of the date/time; the partition number from the latest event in the snapshot; the offset number from the latest event in the snapshot, among others. Kafka can be the pipe through which data can be sent (e.g., via messages) and Cassandra can be the storage where data can be stored.

The mp-rest-server application 205, on a REST endpoint call, can create a playback queue on RabbitMQ, and spawn an instance of mp-x-playback-batch application 215 to handle playback as of a given date and time.

The mp-x-daemon application 210 can run at a first time interval (e.g., 10 minutes, or other suitable time duration), and at a second time interval (e.g., 24 hours, or other suitable time duration), and handle creating a snapshot in the Cassandra infrastructure of the current state as of the current date and current time. The number of snapshots (records) stored and the time period in which the snapshots are generated can be user-defined or triggered by an event or signaling. In one exemplary embodiment, only one snapshot (record) can be stored for every day of data being kept. The mp-x-daemon application 210 accomplishes creating a snapshot by using the mp-x-snapshot-producer library 220 to get the snapshot as of that date and time.

The mp-x-playback-batch application 215 can use the mp-x-snapshot-producer library 220 to get the snapshot as of a given date and time and can put those messages into the playback queue. The mp-x-snapshot-producer library 220 can retrieve the most recent Cassandra snapshot as of a given date and time, and can fill in events from the Kafka infrastructure 225 up to that actual given date and time to produce a snapshot object representing state. The mp-x-repository library 230 can handle the Java to Cassandra infrastructure 235 mapping, table creation, and key space creation for a specific domain.

Figure 2B:
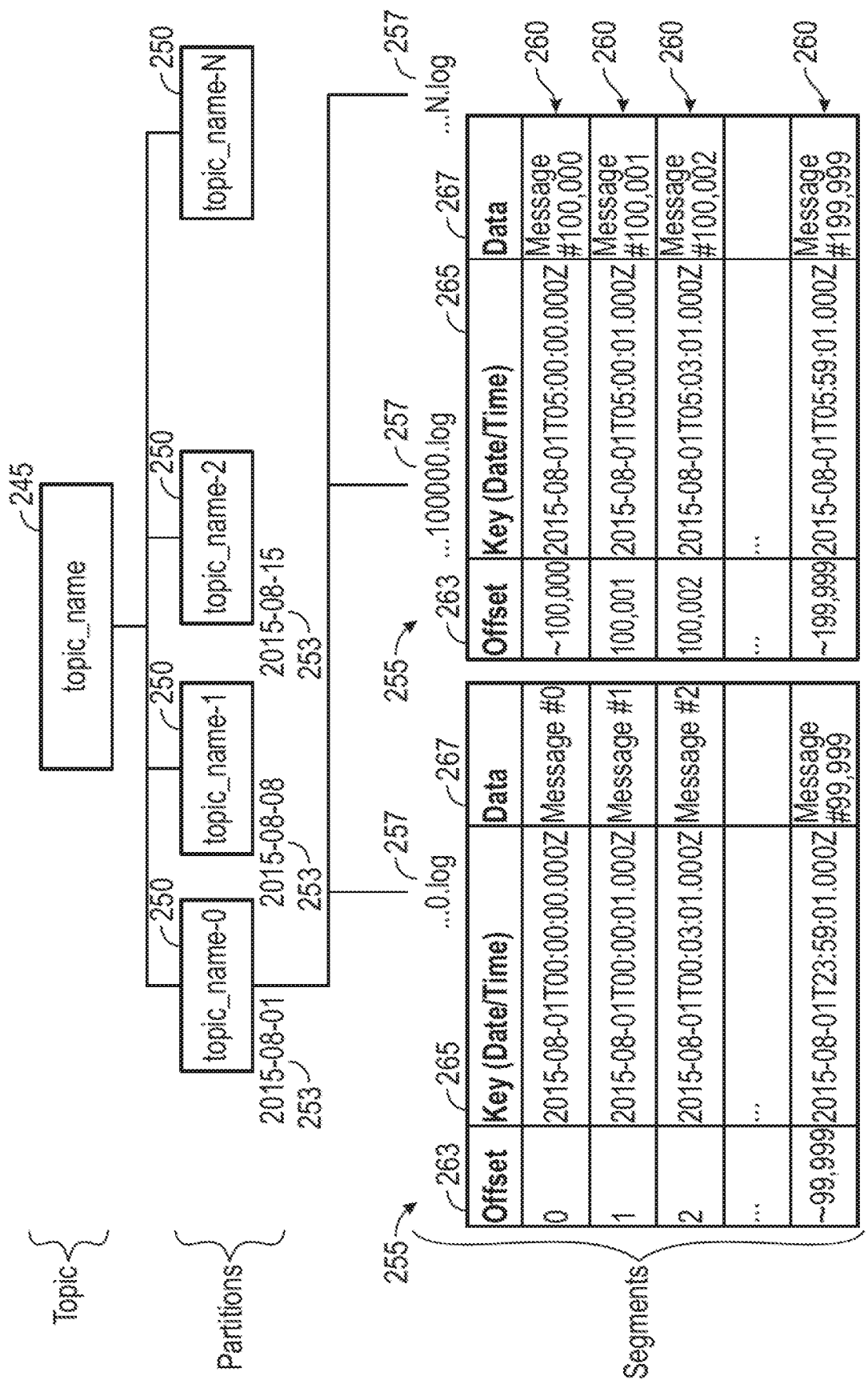
FIG. 2B illustrates an exemplary data partition hierarchy in accordance with one or more exemplary embodiments of the present disclosure.

FIG. 2B illustrates an exemplary data partition hierarchy in accordance with one or more exemplary embodiments of the present disclosure. The partitioning hierarchy can be the manner in which partitions are organized within an individual topic. In one exemplary embodiment, each partition can represent a week's-worth of data, where events are keyed (organized) by date/time. The Kafka infrastructure 225 can store information in a data hierarchy of one or more topics 245, where each topic 245 can contain one or more numbered partitions 250, and each partition 250 can contain one or more segments 255 that can contain one or more events 260. Each topic 245 can be user-configured or automatically generated related to a particular topic related to the railroad network or domain.

The partition 253 can include a Date and Time, or other timestamp 253. The number of partitions 250 for a topic 245 can be finite, and when a last partition for a topic 245 can be filled with data, data can be stored on the first partition, such that data can be constantly stored and overwritten, with the number and size of the partition 250 determining the window of potential analysis. Once all of the partitions are filled, they can be stored in cold storage for analytics purposes over a longer time period. Each segment 255 can stores messages in groups by maximum file size. The segment 255 can include a segment filename 257 where a number can indicate the offset of the file and can end in a .log suffix, or other suitable suffix. The system can request an offset that is provided by a user via system user interface. The user can only request offsets before a date/time and offsets are typically from the start of a segment. The Date/time can be in a milliseconds format, or other suitable format. Each event 260 can include one or more fields having data or other suitable format. In another exemplary embodiment, a first segment 255 can include an offset field 263, a key (date/time) field 265, and a data field 267. The data field 267 can include system messages related to railroad network, assets, or domains, as described herein. The messages can be spread across all of the partitions within a topic 245.

In one exemplary embodiment, retrieving data from the Kafka infrastructure 225 can be achieved via an API, or other suitable network connection or protocol. For the purposes of time-period specific event aggregation (Snapshots), all of the event types can be related to a field that can be common to all. In one exemplary embodiment, the snapshots are related via the "Train Symbol." The second part of any retrieval can include a requested time-period, which as a whole represents the state of the related events as of a specific date/time. In one exemplary embodiment, the requested time period can be represented by the variable "Period", which can be a representation of the date/time for which the state was taken, or other suitable timestamp or duration. In another exemplary embodiment, the events in a domain specified by a user of the system are to be retrieved, and specifically the most recent event for a particular train symbol. In another exemplary embodiment any message type for any domain can be retrieved. In another exemplary embodiment, the most recent event for any specified data type can retrieved, including station, dispatcher, or other suitable data type.

In one exemplary embodiment, system can return the state of any domain as of a given date/time. The state consists of all events that are "active" as of that given date/time, organized by train symbol. It does this by using the last available snapshot in the Cassandra infrastructure 235 as a starting point, and then filling in the remaining events between the time that snapshot ended and the given date/time using events directly from the Kafka infrastructure 225.

In operation, as shown in the following non-limiting exemplary embodiment, the closest prior snapshot (record) to the given date/time can be obtained. The closest snapshot can be determined by the system by retrieving all of the snapshots and sorting them according to timestamp. The most recent snapshot can be cached to saves retrieval time. Using that snapshot, all records for the train identified by "Train Symbol" are retrieved for that period. Using the stored Train Symbol snapshots (records), a Data Transfer Object (DTO) for the snapshots can be created in memory. The in-memory snapshot DTO contains all of the events by train symbol needed to represent the state of the Schedules Domain as of a given date/time (period). Using events from a specified topic 245, all events between the last snapshot and the given date/time are obtained and merged into the snapshot DTO. All events between the last (newest) snapshot and the specified date/time are obtained.

In another operational exemplary embodiment, the system can generate approximately 500,000 messages per day. The file size of the messages can vary from approximately 5 GB unzipped and 300 MB zipped. One partitioning strategy can be 5 GB per day, with 1 GB per segment. Resulting in approximately 1.825 TB per year uncompressed (365 partitions—one per day) and 12.775 TB per 7 years uncompressed (2,555 partitions).

Figure 3:
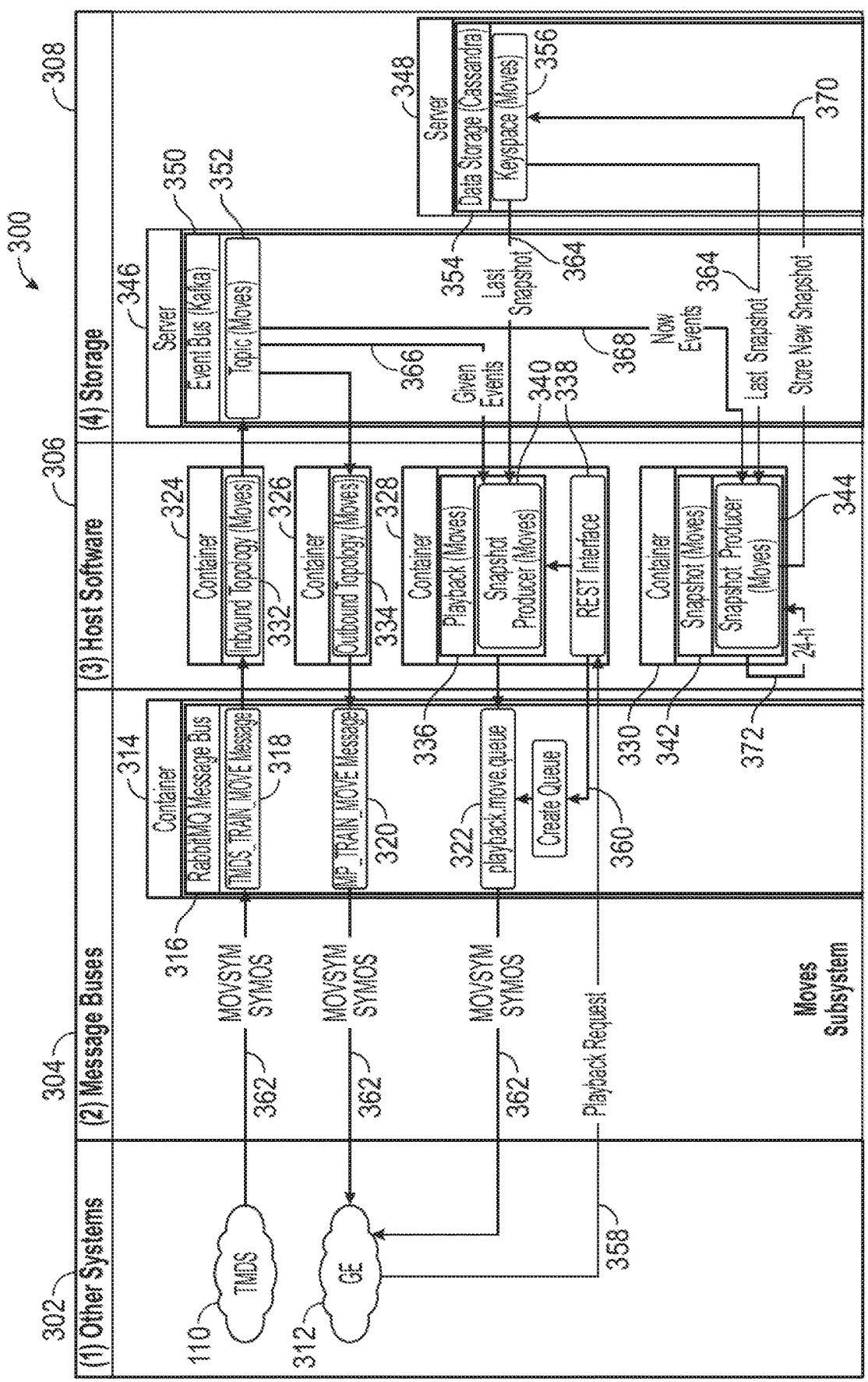
FIG. 3 illustrates an exemplary moves subsystem of a playback and snapshot system in accordance with one or more exemplary embodiments of the present disclosure.

FIG. 3 illustrates an exemplary moves subsystem 300 of a playback and snapshot system in accordance with one or more exemplary embodiments of the present disclosure. The embodiment of the moves subsystem 300 can be illustration only. FIG. 3 does not limit the scope of this disclosure to any particular implementation of a moves subsystem.

The moves subsystem 300 can include other systems 302, a message bus 304, host software 306, and storage 308. The other systems 302 can include a TMDS 110 and a third-party system (e.g., GE system) 312. The message bus 304 can include a container 314 with a RabbitMQ message bus 316. The host software 306 can include containers 324, 326, 328, 330. Container 324 can include a moves inbound topology 332. Container 326 can include an outbound topology 334. Container 328 can include a moves playback 336 with a moves snapshot producer 340 and a REST interface 338. Container 330 can include a moves snapshot 342 with a moves snapshot producer 334. Storage 308 can include a server 346 with a Kafka event bus 350 and a server 348 with a Cassandra data storage 354. The Kafka event bus 350 can include a moves topic 352 and the Cassandra data storage 354 can include a moves keyspace 356.

The TMDS 110 can send a TMDS_TRAIN_MOVE message 318 over an MOVSYM SYMOS 362 through the RabbitMQ message bus 316 to the moves inbound topology 332. RabbitMQ can be an open-source message-broker software that can support Streaming Text Oriented Messaging Protocol, MQ Telemetry Transport, and other protocols. The moves inbound topology 332 communicates the information to the move topic 352.

The GE system 312 can send a playback request 358 to the REST interface 338. The GE system can receive an MP_TRAIN_MOVE message 320 over the MOVSYM SYMOS 362 through the RabbitMQ message bus 316 from the moves outbound topology 334. The moves outbound topology 334 can receive the information from the moves topic 352. The GE system also receive a playback. move.queue 322 from the moves snapshot produce 340 over the MOVSYM SYMOS 362.

The REST interface 338 can perform a create queue 360 for the playback.move.queue 322. The REST interface 338 can provide the playback request 358 to the moves snapshot producer 340. The moves topic 352 can receive the TMDS_TRAIN_MOVE queue 318.

The moves topic 352 can output to the moves outbound topology 334, the given events 366 for events between the last snapshot and the give time to the moves snapshot producer 340, and now events 368 for events between the last snapshot and now to the moves snapshot producer 344.

The moves keyspace 356 can receive a store new snapshot message 370. The moves keyspace can send the last snapshot 364 to the moves snapshot producer 340 and the moves snapshot producer 344. The moves snapshot 342 recycles the 24-hour snapshot 372.

Figure 4A:
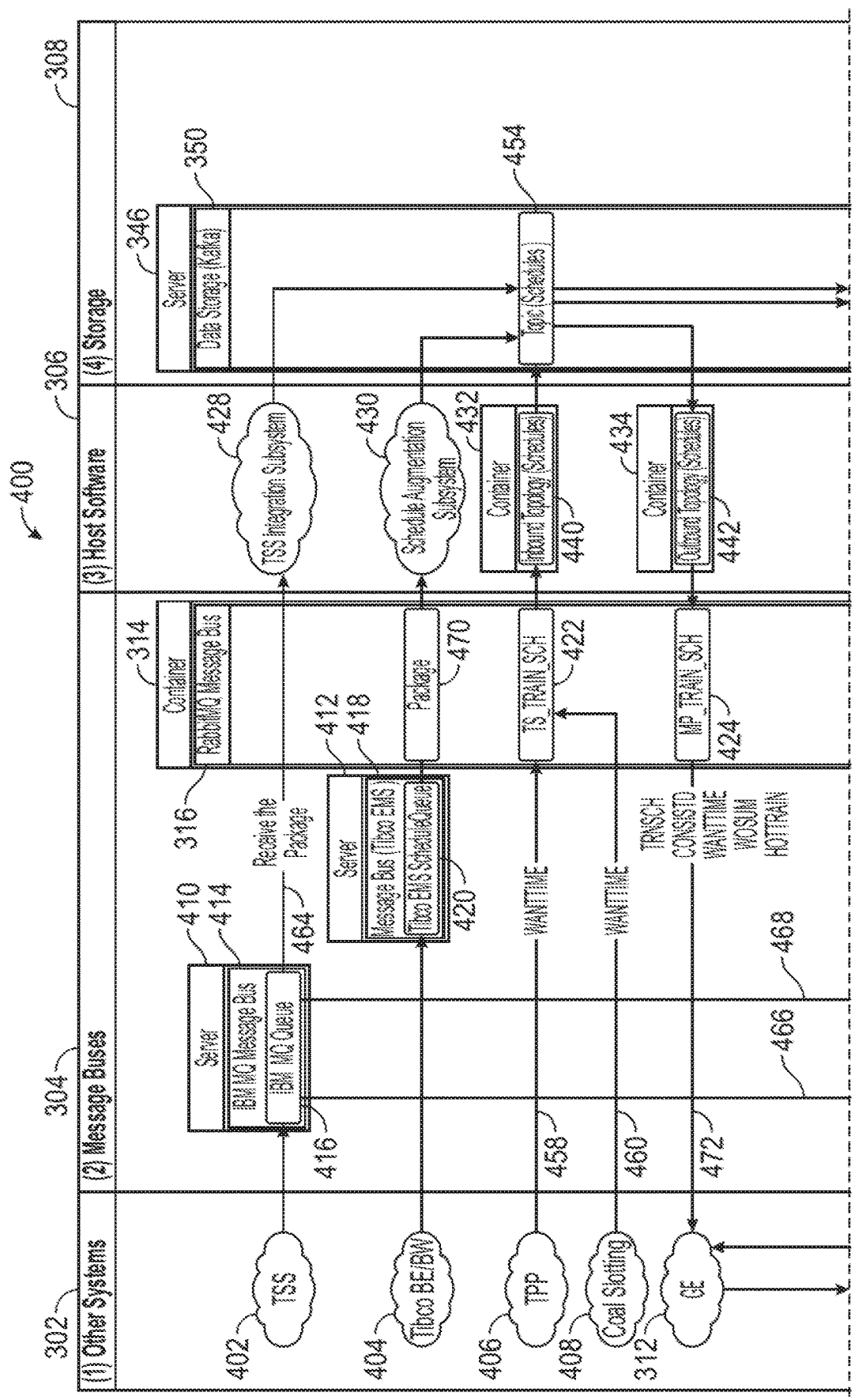
FIGS. 4A and 4B illustrate an exemplary schedules subsystem of a playback and snapshot system in accordance with one or more exemplary embodiments of the present disclosure.
Figure 4B:
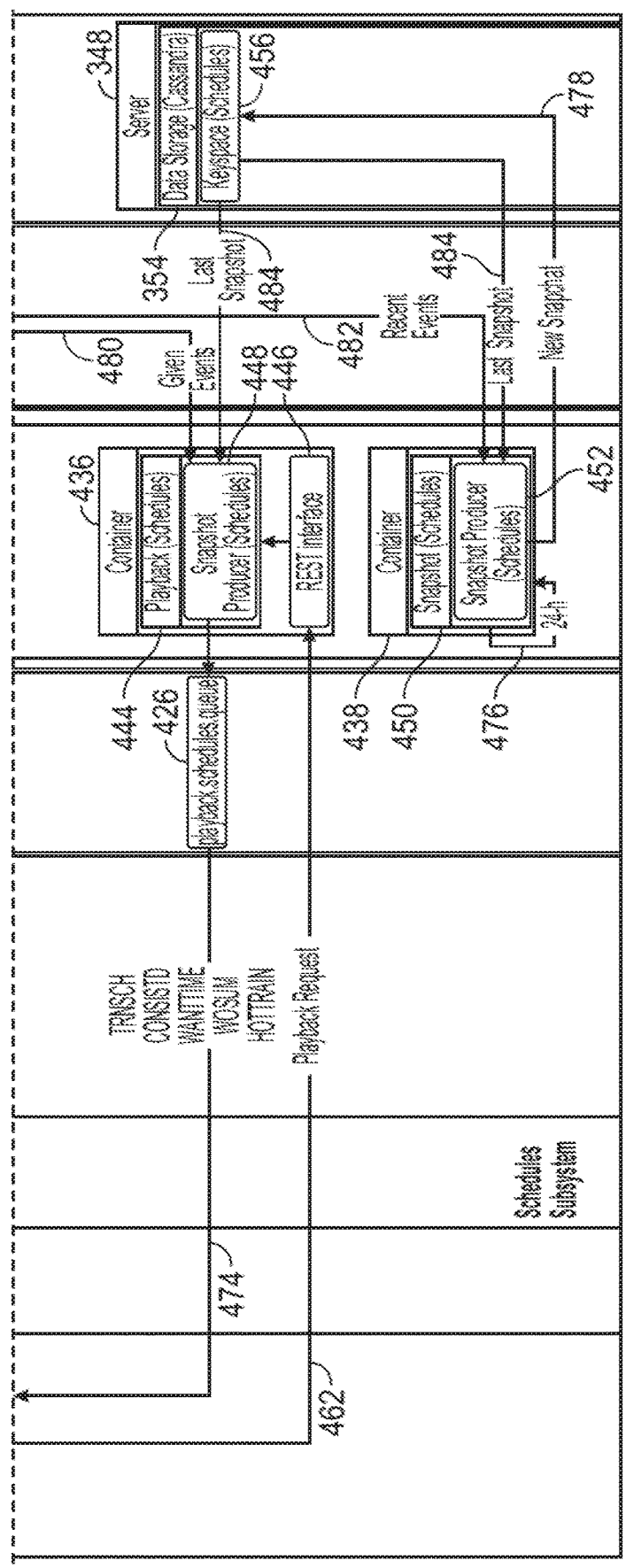

FIGS. 4A and 4B illustrate an exemplary schedules subsystem 400 of a playback and snapshot system in accordance with one or more exemplary embodiments of the present disclosure. The other system 302 of the schedules subsystem 400 can include a TSS 402, a Tibco BE/BW 404, a TPP 406, a coal slotting system 408, or the GE system 312. The message buses 304 can include a server 410 including an IBM MQ message bus 414 with an IBM MQ Queue 416, and a server 412 including a Tibco EMS message bus 418 with a Tibco EMS schedules queue 420. The message bus 304 can include a container 314 with a RabbitMQ message bus 316. The host software 306 can include a TSS Integration subsystem 428, a schedule augmentation subsystem 430, a container 432 with a schedules inbound topology 440, a container 434 with a schedules outbound topology 442, a container 436 with a schedules playback 444 containing a schedules snapshot producer 448 and with a REST interface 446, and a container 450 with a schedules snapshot 450 containing a schedules snapshot producer 452. The storage 308 can include schedules messages 454 in the Kafka data storage 350. Cassandra data storage, which preferably can be a non-SQL database, can store the most recent schedule for a train as a JSON representation.

The TSS system 402 communicates to the IBM MQ queue 416. The Tibco BE/BW communicates to the schedules queue 420. The TPP 406 transmits a WANTTIME message 458 to a TS_TRAIN_SCH queue 424. The coal slotting system 408 transmits a WANTTIME message 460 to the TS_TRAIN_SCH queue 424. The GE system 312 transmits a playback request 462 as of a given time to the REST interface 446. The GE system 312 can receive a package 472 from the MP_TRAIN_SCH queue 424 that can include one or more of a TRNSCH message, a CONSISTD message, a WANTTIME message, a WOSUM message, and a HOTTRAIN message. The GE system 312 can receive a package 474 from the playback.schedules.queue 426 that can include one or more of a TRNSCH message, a CONSISTD message, a WANTTIME message, a WOSUM message, and a HOTTRAIN message. The package 474 originates from the schedules snapshot producer 448.

Figure 5:
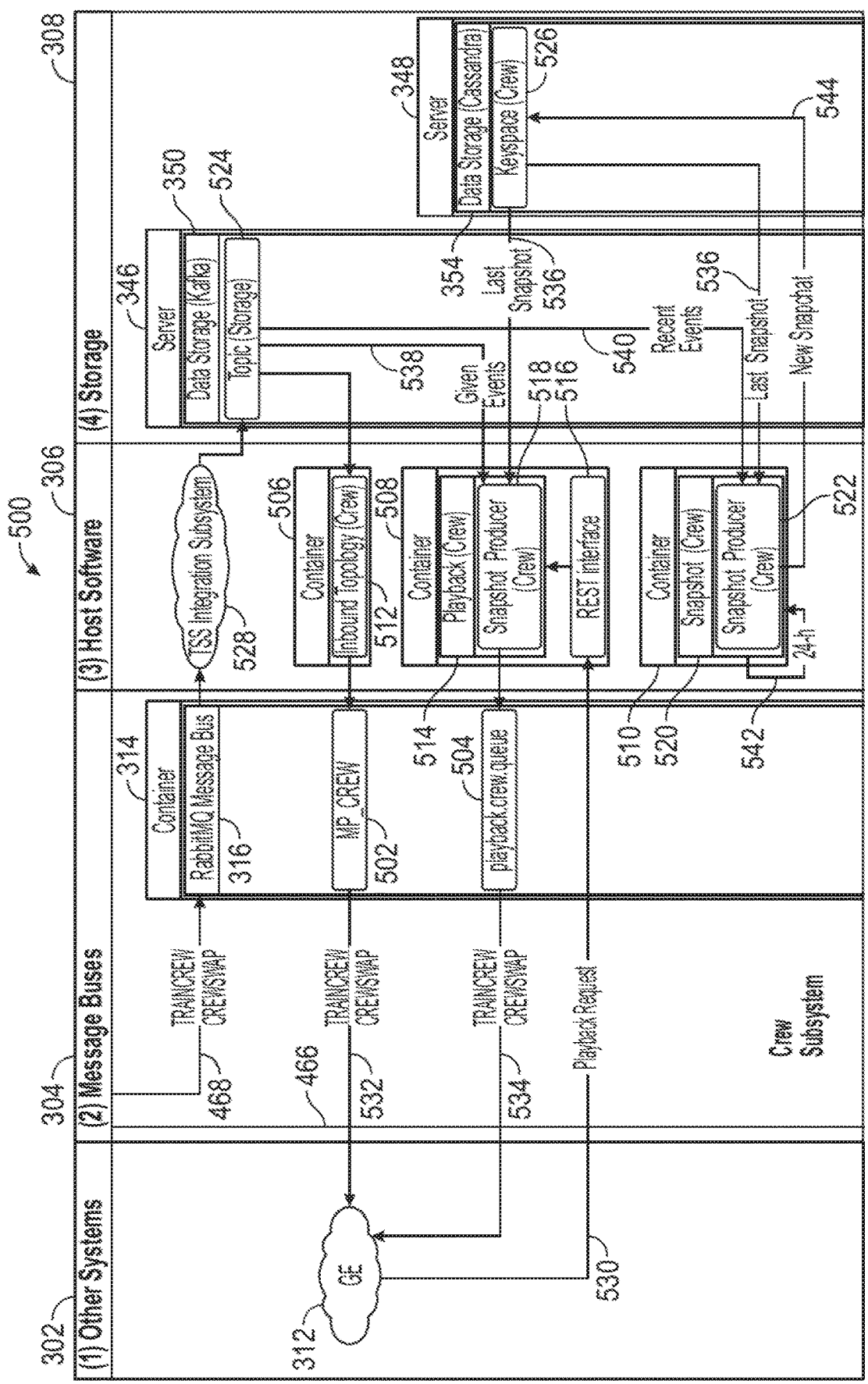
FIG. 5 illustrates an exemplary crew subsystem of a playback and snapshot system in accordance with one or more exemplary embodiments of the present disclosure.
Figure 6:
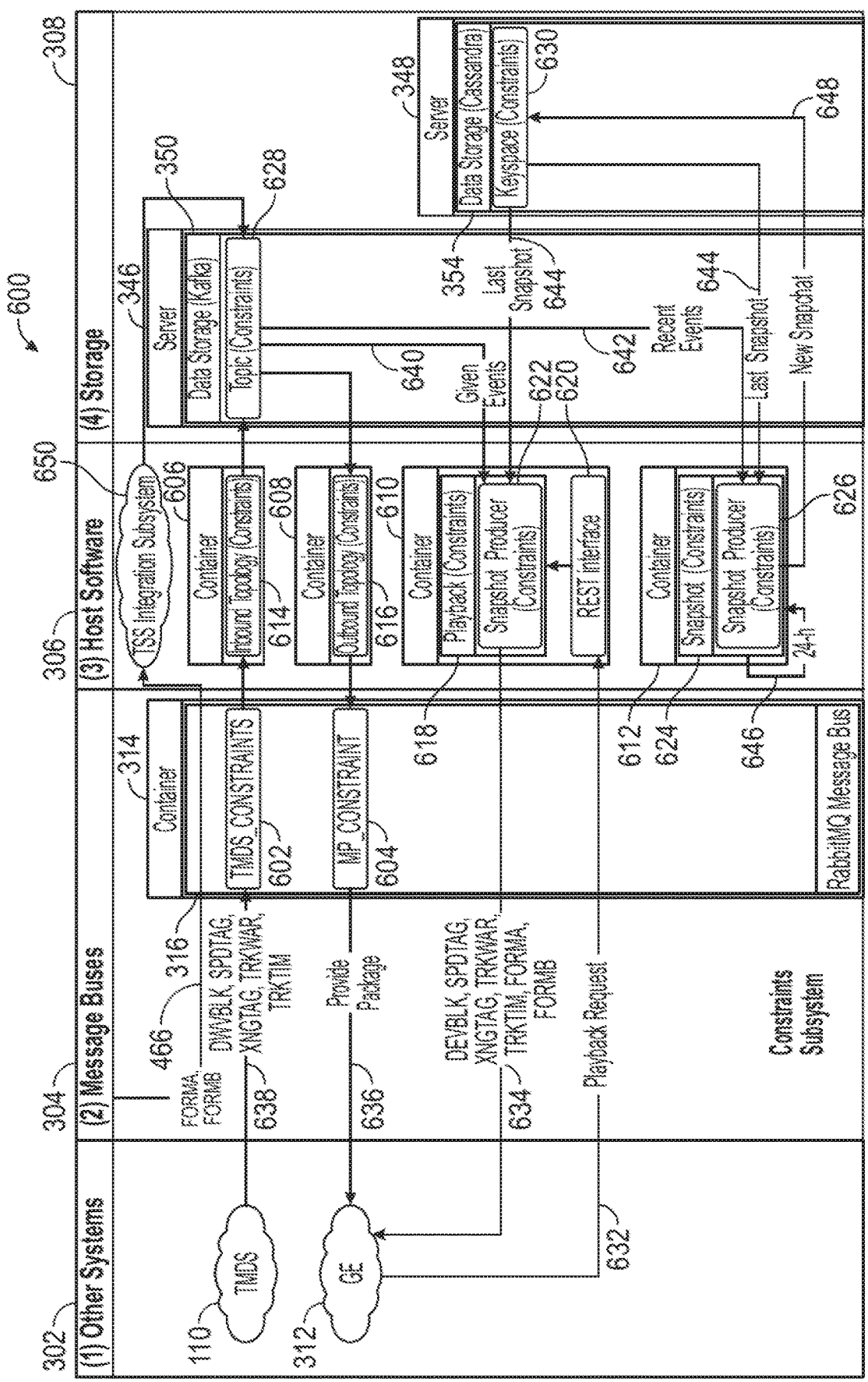
FIG. 6 illustrates an exemplary constraints subsystem of a playback and snapshot system in accordance with one or more exemplary embodiments of the present disclosure.

The IMB MQ queue 416 transmits a package 466 with a FORMA message or a FORMB message to the constraint subsystem 600 illustrated in FIG. 6. The IMB MQ queue 416 transmits a package 468 with a TRAINCREW message or a CREWSWAP message to the crew subsystem 500 illustrated in FIG. 5.

All the messages in the schedules domain are stored in the Kafka storage 350. At a given interval (e.g., 24 hours), the schedule snapshot producer processes the pertinent messages (e.g., WANTTIME, TRNSCH, and so on) and determines which messages are still valid. The valid messages are stored in the Cassandra storage 354. The snapshot and subsequent events are then played back on the appropriate queue on demand (e.g., when requested via the REST interface. (Every domain discussed below preferably functions in a similar manner.)

FIG. 5 illustrates an exemplary crew subsystem 500 of a playback and snapshot system in accordance with one or more exemplary embodiments of the present disclosure. The other systems 302 of the crew subsystem 500 can include a GE system 312. The message buses 304 include a container 314 with a RabbitMQ message bus 316. The host software 306 can include a TSS Integration subsystem 528, a container 506 with a crew inbound topology 512, a container 508 with a crew playback 514 containing a crew snapshot producer 518 and with a REST interface 516, and a container 510 with a crew snapshot 520 containing a crew snapshot producer 522. The storage 308 can include a crew topic 524 in the Kafka data storage 350 and a crew keyspace 526 in the Cassandra data storage 354.

The GE system 312 transmits a playback request 530 as of a given time to the REST interface 516. The GE system 312 can receive a package 532 from the MP_CREW queue 502 that can include one of a TRAINCREW message and a CREWSWAP message. The GE system 312 can receive a package 534 from the playback.crew.queue 504 that can include one of a TRAINCREW message and a CREWSWAP message. The package 534 originates from the crew snapshot producer 518.

The TSS integration subsystem 528 can receive the package 468 with a TRAINCREW message or a CREWSWAP message from the IMB MQ queue 416 illustrated in FIG. 4. The TSS integration subsystem 528 passes the package 468 to the crew topic storage 524, which can provide package 532 to the crew outbound topology 512, the given events 538 for events between a last snapshot and a given time to the crew snapshot producer 518, and the recent events 540 for events between a last snapshot and the current time to crew snapshot producer 522. The crew keyspace 526 can receive a store new snapchat message 544 and produces a last snapshot 536, each communicated with the crew snapshot producer 522. The crew keyspace 526 also produces the last snapshot 536 for the crew snapshot producer 518. The crew snapshot producer 522 produces a new snapshot at a specific interval 542 (e.g. 24 hours).

FIG. 6 illustrates an exemplary constraints subsystem 600 of a playback and snapshot system in accordance with one or more exemplary embodiments of the present disclosure. The other systems 302 of the constraints subsystem 600 can include a TMDS system 110 and a GE system 312. The message buses 304 can include a container 314 with a RabbitMQ message bus 316. The host software 306 can include a TSS Integration subsystem 650, a container 606 with a constraints inbound topology 614, a container 608 with a constraints outbound topology 616, a container 610 with a constraints playback 618 containing a constraints snapshot producer 622 and with a REST interface 620, and a container 624 with a constraints snapshot 624 containing a constraints snapshot producer 626. The storage 308 can include a constraints topic 628 in the Kafka data storage 350 and a constraints keyspace 630 in the Cassandra data storage 354.

The TMDS system 110 transmits a package 638 through the TMDS_constraints queue 602 to the constraints inbound topology 614. The package 638 can include one or more of a DWVBLK message, a SPDTAG message, a XNGTAG message, a TRKWAR message, and a TRKTIM message. The package 638 can be passed to the constraints topic 628.

The GE system 312 transmits a playback request 632 as of a given time to the REST interface 620. The GE system 312 can receive a package 472 from the MP_CON-STRAINT queue 604 that can include one or more of a DEVBLK message, a SPDTAG message, a XNGTAG message, a TRKWAR message, a TRKTIM message, a FORMA message, and a FORMB message. The GE system 312 can receive a package 634 from the constraints snapshot producer 622 that can include one or more of a DEVBLK message, a SPDTAG message, a XNGTAG message, a TRKWAR message, a TRKTIM message, a FORMA message, and a FORMB message.

The TSS integration subsystem 650 can receive the package 466 with a FORMA message or FORMB message from the IMB MQ queue 416 illustrated in FIG. 4. The TSS integration subsystem 528 passes the package 466 to the crew topic storage 524, which can provide package 636 to the constraints outbound topology 616, the given events 640 for events between a last snapshot and a given time to the constraints snapshot producer 622, and the recent events 642 for events between a last snapshot and the current time to constraints snapshot producer 626. The constraints keyspace 630 can receive a store new snapchat message 648 and produces a last snapshot 644, each communicated with the constraints snapshot producer 626. The constraints keyspace 630 also produces the last snapshot 644 for the crew snapshot producer 626. The constraints snapshot producer 626 produces a new snapshot at a specific interval 646 (e.g. 24 hours).

Figure 7:
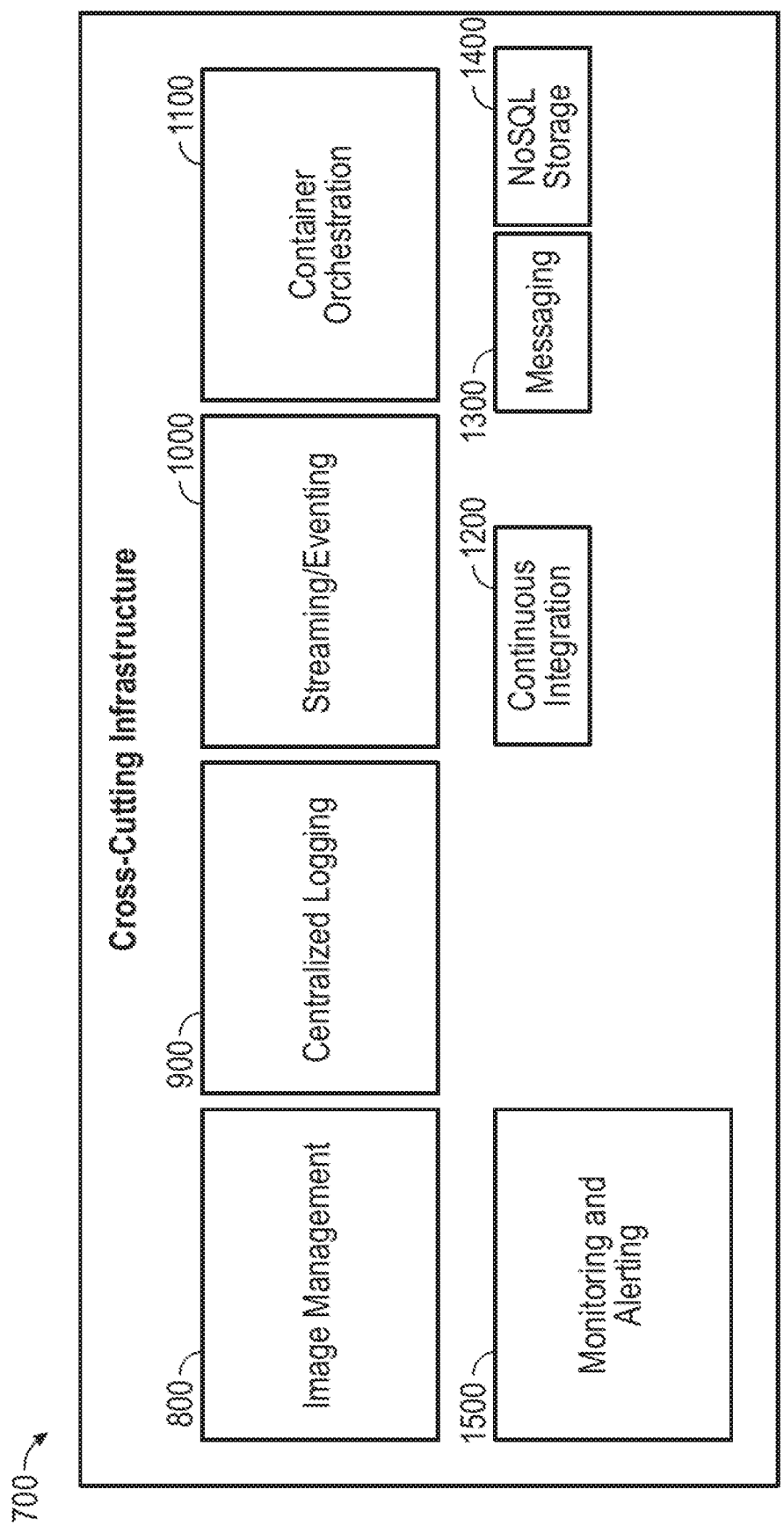
FIG. 7 illustrates an exemplary cross-cutting infrastructure of a playback and snapshot system in accordance with one or more exemplary embodiments of the present disclosure.

FIG. 7 illustrates an exemplary cross-cutting infrastructure 700 of a playback and snapshot system in accordance with one or more exemplary embodiments of the present disclosure. The cross-cutting infrastructure 700 can include image management 800, centralized logging 900, streaming/event 1000, container orchestration 1100, continuous integration 1200, messaging 1300, NoSQL storage 1400, and monitoring and alerting 1500. The cross-cutting infrastructure 700 is operably coupled with the playback and snapshot system.

The cross-cutting infrastructure 700 can be implemented in control logic, an algorithm on a server, a machine learning module, or other suitable system. The cross-cutting infrastructure 700 can be implemented with software, hardware, an application programming interface (API), a network connection, a network transfer protocol, HTML, DHTML, JavaScript, Dojo, Ruby, Rails, other suitable applications, or any suitable combination thereof.

Figure 8:
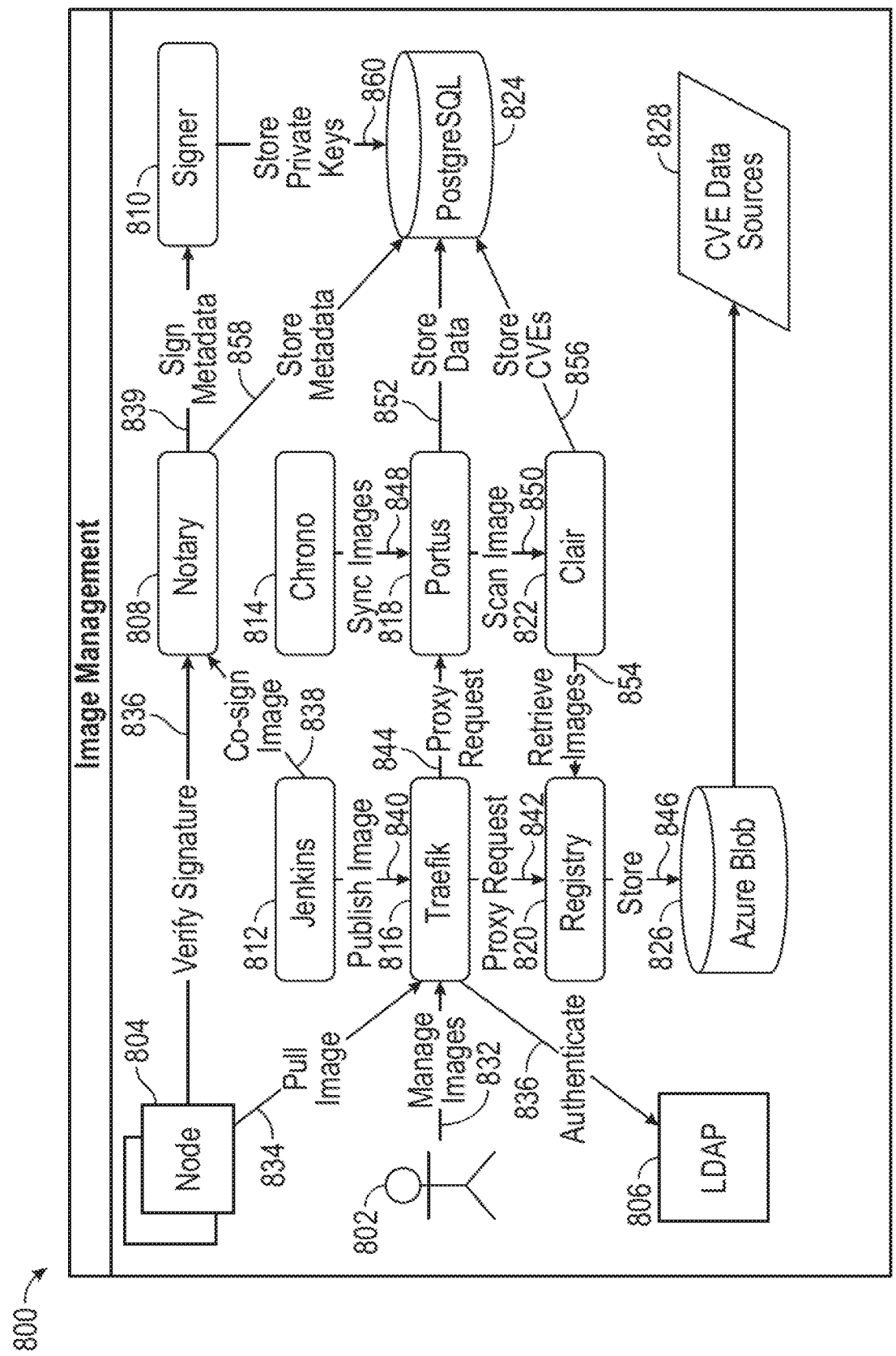
FIG. 8 illustrates an exemplary image management of the cross-cutting infrastructure in accordance with one or more exemplary embodiments of the present disclosure.

FIG. 8 illustrates an exemplary image management 800 of the cross-cutting infrastructure in accordance with one or more exemplary embodiments of the present disclosure. The image management 800 can include a plurality of nodes 804, an LDAP 806, a notary 808, a signer 810, a Jenkins 812, a Chrono 814, a Traefik 816, a Portus 818, a registry 820, a Clair 822, a PostgreSQL 824, an Azure Blob 826, and a CVE data sources 828, and is operable by a user 802.

The LDAP 806, notary 808, signer 810, Jenkins 812, Chrono 814, Traefik 816, Portus 818, registry 820, Clair 822, PostgreSQL 824, Azure Blob 826, and CVE data sources 828, can be implemented in control logic, an algorithm on a server, a machine learning module, or other suitable system. The LDAP 806, notary 808, signer 810, Jenkins 812, Chrono 814, Traefik 816, Portus 818, registry 820, Clair 822, PostgreSQL 824, Azure Blob 826, and CVE data sources 828 can be implemented with software, hardware, an application programming interface (API), a network connection, a network transfer protocol, HTML, DHTML, JavaScript, Dojo, Ruby, Rails, other suitable applications, or any suitable combination thereof.

In operation 832, the user can manage images into Traefik 816. In operation 834, the Traefik pulls an image from the plurality of nodes 804. In operation 836, the notary 808 verifies a signature from the plurality of nodes 804. In operation 838, the notary 808 co-signs an image from Jenkins 812. In operation 839, the notary sign metadata to the signer 810. In operation 840, the Jenkins 812 publishes the image to Traefik 840. In operation 842, the Traefik can send a proxy request to the registry 820. In operation 844, the Traefik send a proxy request to the Portus 818. In operation 846, the registry 846 stores the image in the azure blob 826 and ultimately to the CVE data sources 828. In operation 848, the Chrono 814 sync images in the Portus 818. In operation 850, the Portus 818 scans the image to Clair 822. In operation 852, the Portus stores the data to the PostgreSQL 824. In operation 854, the registry 820 retrieves the images from Clair 822. In operation 856, the Clair 822 stores CVEs to the PostgreSQL 824. In operation 858, the notary 808 stores the metadata to the PostgreSQL 824. In operation 860, the signer 810 stores private keys in the PostgreSQL.

Figure 9:
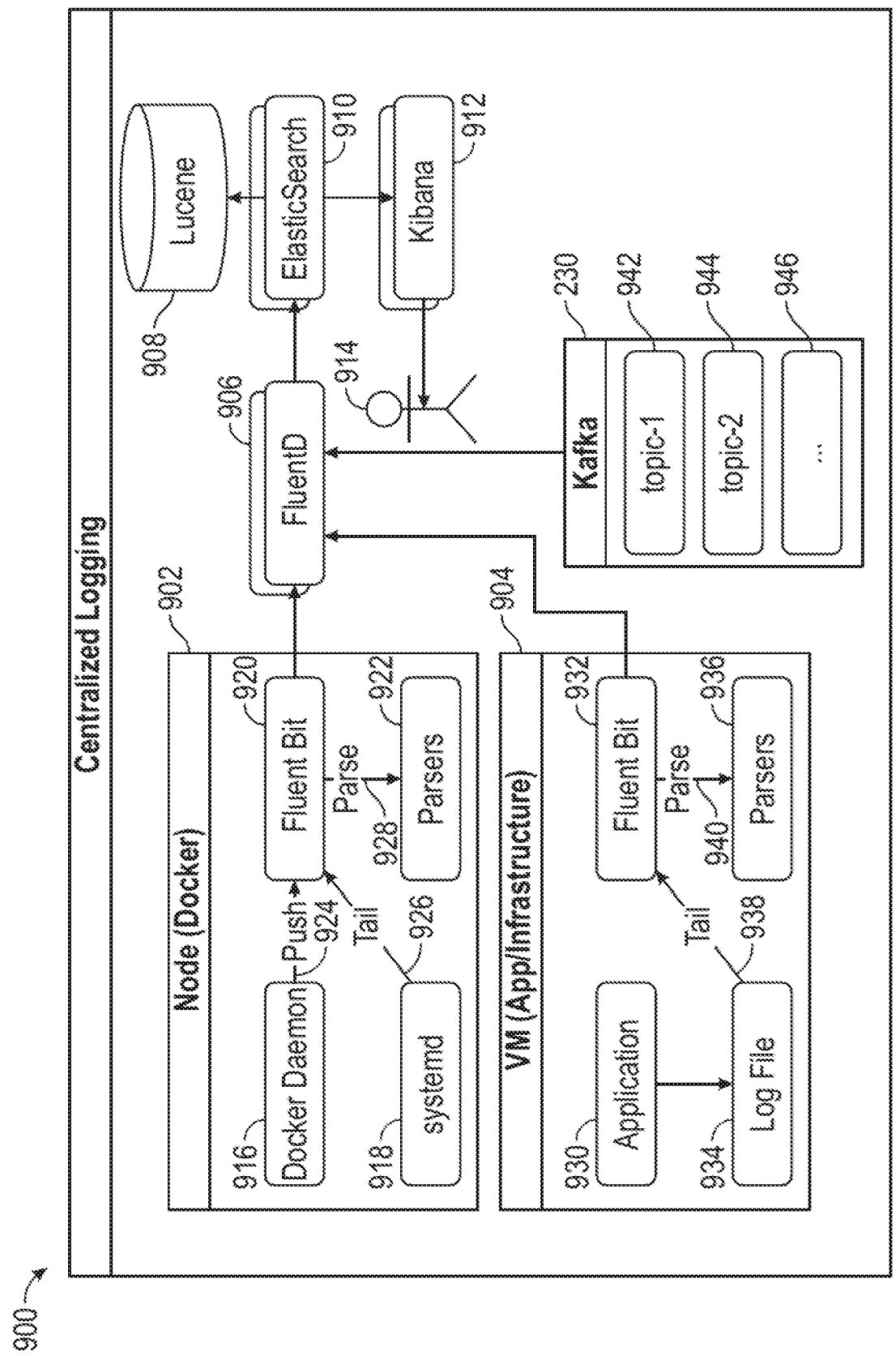
FIG. 9 illustrates an exemplary centralized logging of the cross-cutting infrastructure in accordance with one or more exemplary embodiments of the present disclosure.

FIG. 9 illustrates an exemplary centralized logging 900 of the cross-cutting infrastructure in accordance with one or more exemplary embodiments of the present disclosure. The centralized logging 900 includes a node 902, a VM 904, a FluentD 906, a Lucene 908, an ElasticSearch 910, a Kibana 912, a user 914, and Kafka 230. The node 902 includes a docker daemon 916, a systemd 918, a Fluent Bit 920, and a parser 922. The docker daemon pushes 924 information to the fluent bit 920. The systemd 918 tails 926 information to the fluent bit 920. The fluent bit 920 parses 928 information to the parsers 922. The VM 904 includes an application 930, a fluent bit 932, a log file 934, and parsers 936. The log file 934 tails 938 information to the fluent bit 932. The fluent bit 932 parses 940 information in the parsers 936. The Kafka 230 includes a first topic 942, a second topic 944, an nth topic 946.

The centralized logging 900 can be implemented in control logic, an algorithm on a server, a machine learning module, or other suitable system. The centralized logging 900 can be implemented with software, hardware, an application programming interface (API), a network connection, a network transfer protocol, HTML, DHTML, JavaScript, Dojo, Ruby, Rails, other suitable applications, or any suitable combination thereof.

Figure 10:
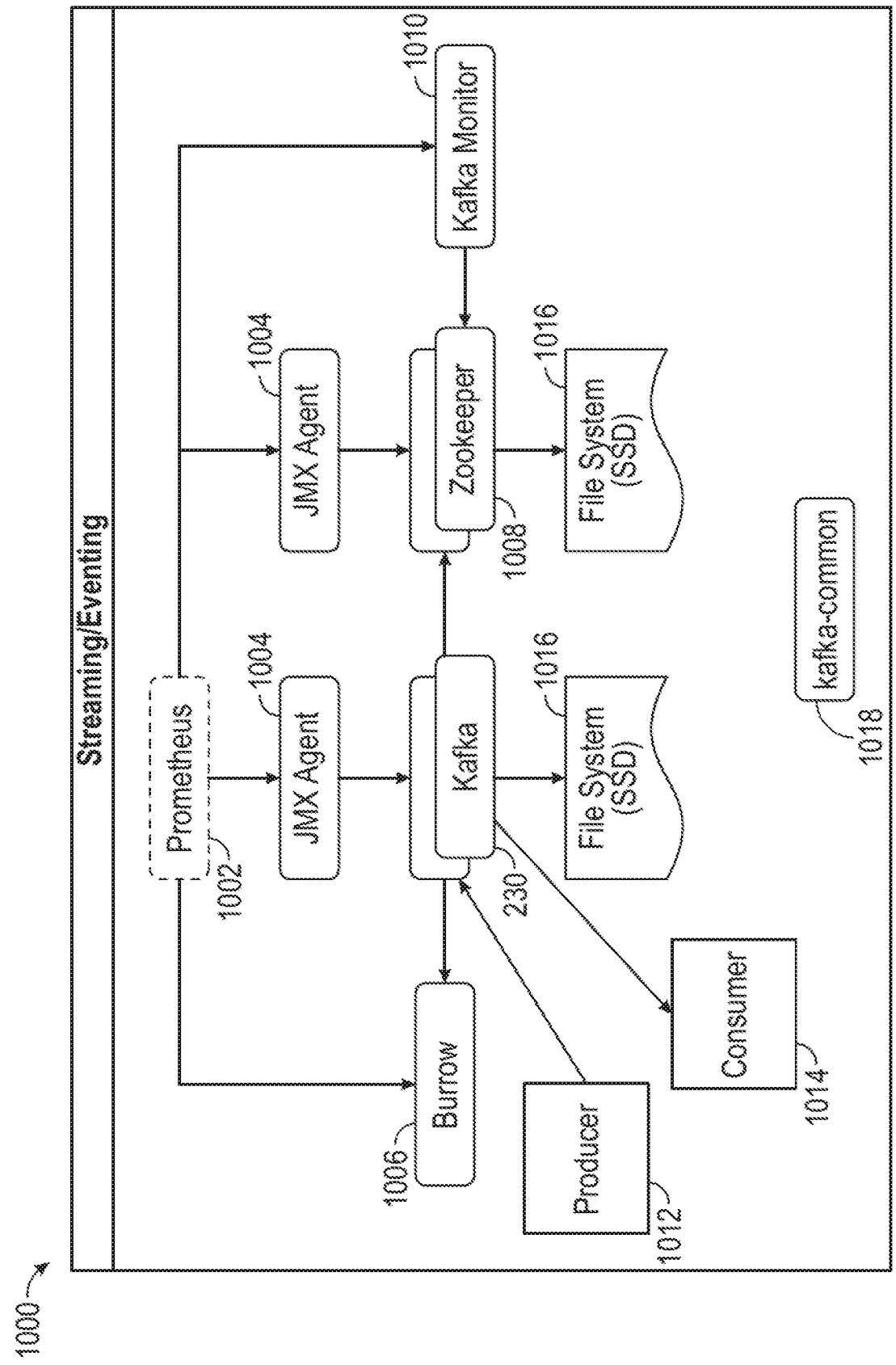
FIG. 10 illustrates an exemplary streaming/eventing of the cross-cutting infrastructure in accordance with one or more exemplary embodiments of the present disclosure.

FIG. 10 illustrates an exemplary streaming/eventing 1000 of the cross-cutting infrastructure in accordance with one or more exemplary embodiments of the present disclosure. The streaming/eventing 1000 includes a Prometheus 1002, a plurality of JMX agents 1004, a burrow 1006, a plurality of Kafkas 230, a plurality of zookeeper 1008, a Kafka monitor 1010, a producer 1012, a consumer 1014, a plurality of SSD file systems 1016 and a kafka-common 1018.

The streaming/eventing 1000 can be implemented in control logic, an algorithm on a server, a machine learning module, or other suitable system. The streaming/eventing 1000 can be implemented with software, hardware, an application programming interface (API), a network connection, a network transfer protocol, HTML, DHTML, JavaScript, Dojo, Ruby, Rails, other suitable applications, or any suitable combination thereof.

Figure 11:
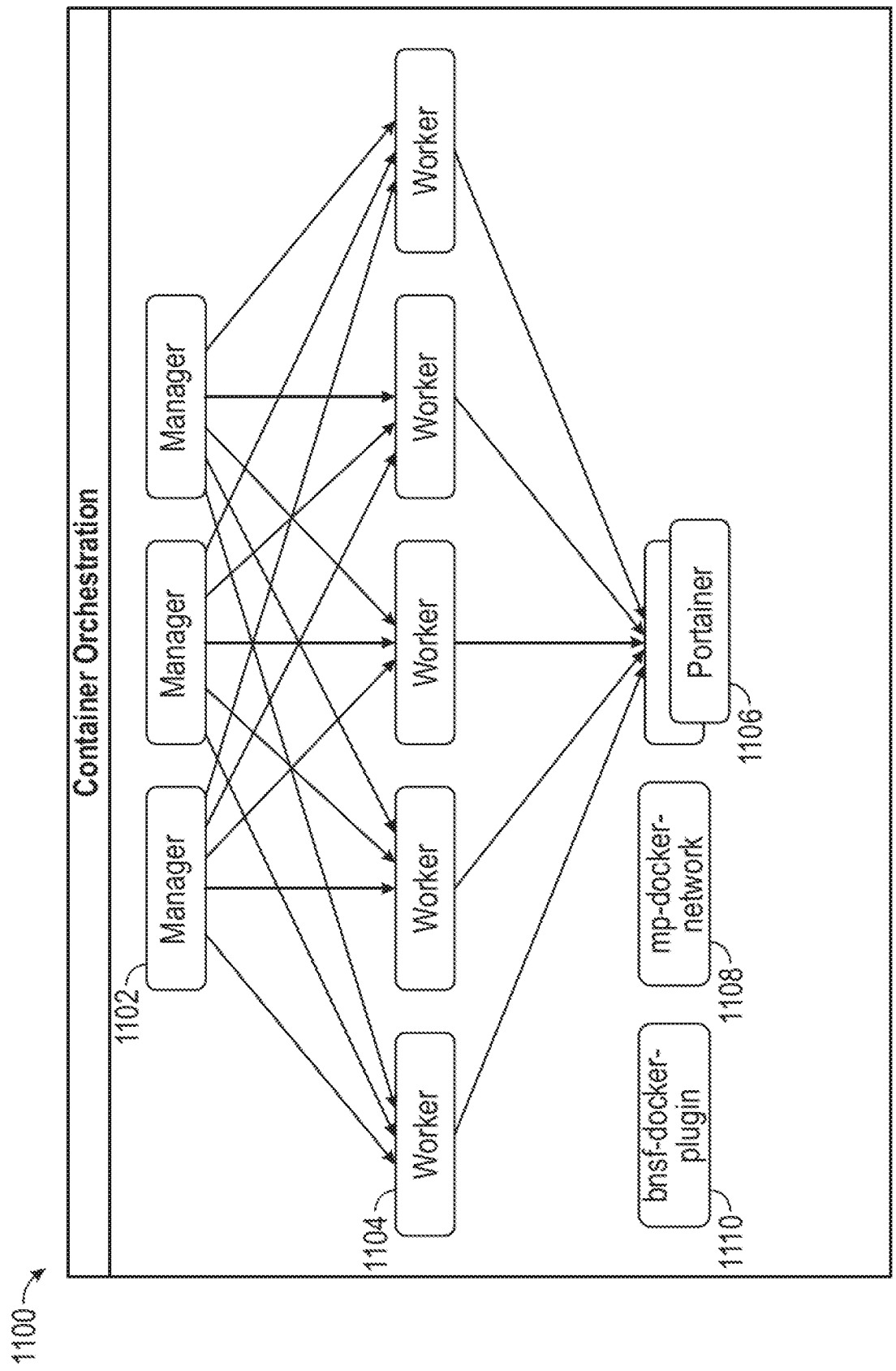
FIG. 11 illustrates an exemplary container orchestration of the cross-cutting infrastructure in accordance with one or more exemplary embodiments of the present disclosure.

FIG. 11 illustrates an exemplary container orchestration 1100 of the cross-cutting infrastructure in accordance with one or more exemplary embodiments of the present disclosure. The container orchestration 1100 includes a plurality of managers 1102, a plurality of workers 1104, a plurality of Portainers 1106, an mp-docker-network 1108, a host-docker-plugin 1110.

The container orchestration 1100 can be implemented in control logic, an algorithm on a server, a machine learning module, or other suitable system. The container orchestration 1100 can be implemented with software, hardware, an application programming interface (API), a network connection, a network transfer protocol, HTML, DHTML, JavaScript, Dojo, Ruby, Rails, other suitable applications, or any suitable combination thereof.

Figure 12:
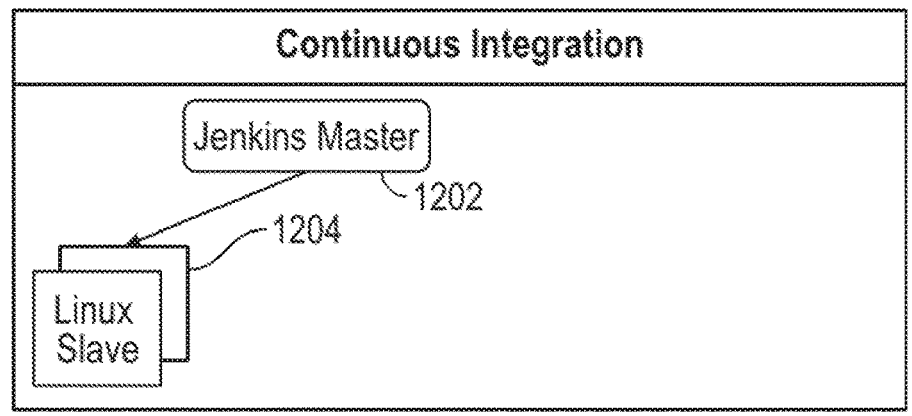
FIG. 12 illustrates an exemplary continuous integration of the cross-cutting infrastructure in accordance with one or more exemplary embodiments of the present disclosure.

FIG. 12 illustrates an exemplary continuous integration 1200 of the cross-cutting infrastructure in accordance with one or more exemplary embodiments of the present disclosure. The continuous integration 1200 includes a Jenkins master 1202 and a plurality of Linux slaves 1204.

The Jenkins master 1202 and plurality of Linux slaves 1204 can be implemented in control logic, an algorithm on a server, a machine learning module, or other suitable system. The container Jenkins master 1202 and plurality of Linux slaves 1204 can be implemented with software, hardware, an application programming interface (API), a network connection, a network transfer protocol, HTML, DHTML, JavaScript, Dojo, Ruby, Rails, other suitable applications, or any suitable combination thereof.

Figure 13:
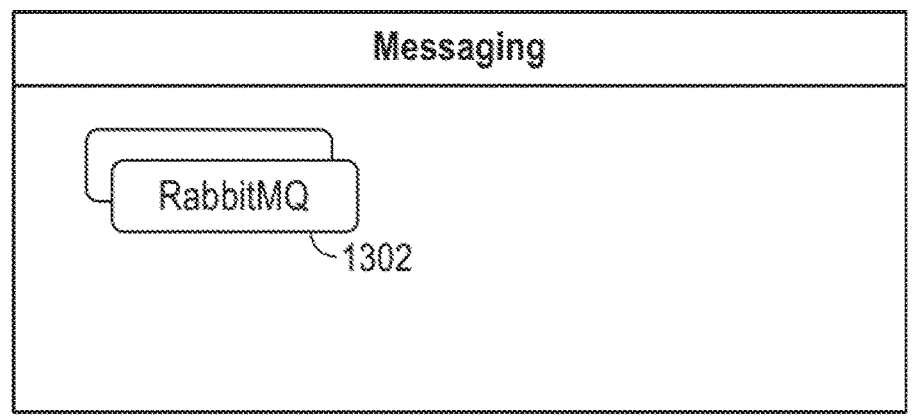
FIG. 13 illustrates an exemplary messaging of the cross-cutting infrastructure in accordance with one or more exemplary embodiments of the present disclosure.

FIG. 13 illustrates an exemplary messaging 1300 of the cross-cutting infrastructure in accordance with one or more exemplary embodiments of the present disclosure. The messaging 1300 includes a plurality of RabbitMQ 1302. The messaging 1300 can be implemented in control logic, an algorithm on a server, a machine learning module, or other suitable system. The messaging 1300 can be implemented with software, hardware, an application programming interface (API), a network connection, a network transfer protocol, HTML, DHTML, JavaScript, Dojo, Ruby, Rails, other suitable applications, or any suitable combination thereof.

Figure 14:
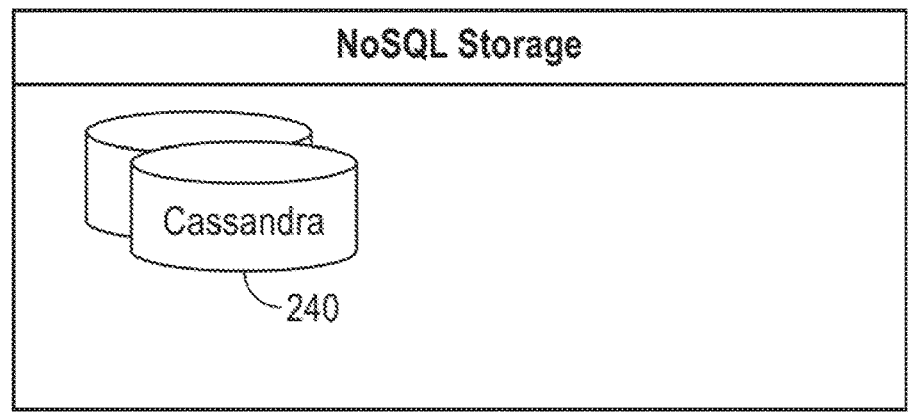
FIG. 14 illustrates an exemplary NoSQL storage of the cross-cutting infrastructure in accordance with one or more exemplary embodiments of the present disclosure.

FIG. 14 illustrates an exemplary NoSQL storage 1400 of the cross-cutting infrastructure in accordance with one or more exemplary embodiments of the present disclosure. The NoSQL storage 1400 includes a plurality of Cassandra 240. The NoSQL storage 1400 can be implemented in control logic, an algorithm on a server, a machine learning module, or other suitable system. The NoSQL storage 1400 can be implemented with software, hardware, an application programming interface (API), a network connection, a network transfer protocol, HTML, DHTML, JavaScript, Dojo, Ruby, Rails, other suitable applications, or any suitable combination thereof.

Figure 15:
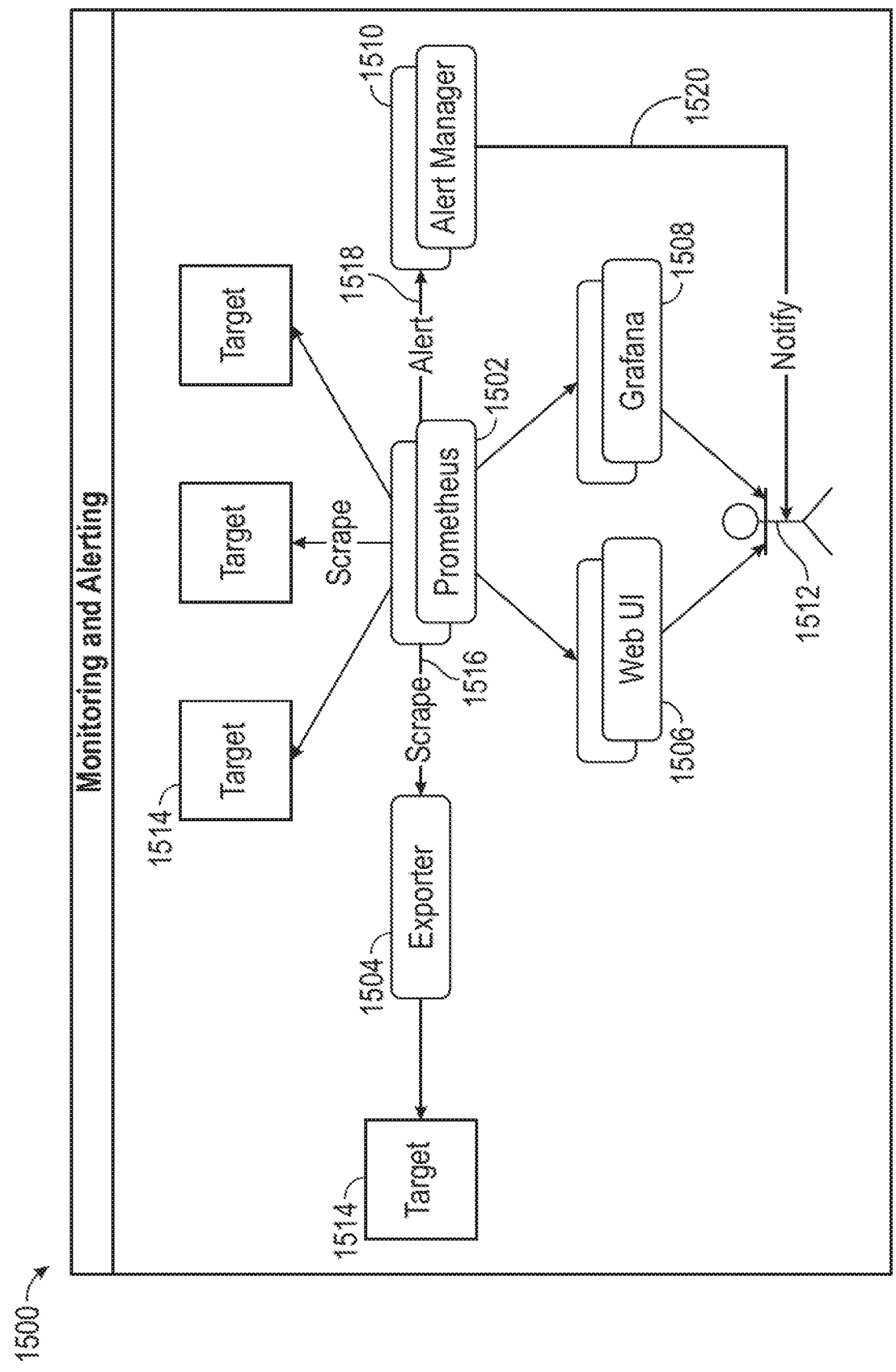
FIG. 15 illustrates an exemplary monitoring and alerting of the cross-cutting infrastructure in accordance with one or more exemplary embodiments of the present disclosure.

FIG. 15 illustrates an exemplary monitoring and alerting 1500 of the cross-cutting infrastructure in accordance with one or more exemplary embodiments of the present disclosure. The monitoring and alerting 1500 includes a plurality of Prometheus 1502, an exporter 1504, a web UI 1506, a Grafana 1508, an alert manager 1510, a user 1512, a plurality of targets 1514. The plurality of Prometheus 1502 scrape 1516 information to the exporter 1504 and the plurality of targets 1514. The plurality of Prometheus 1502 alerts 1518 to the alert manager 1510. The alert manager 1510 notifies 1520 the user 1512 of the alert 1518. The monitoring and alerting 1500 can be implemented in control logic, an algorithm on a server, a machine learning module, or other suitable system. The monitoring and alerting 1500 can be implemented with software, hardware, an application programming interface (API), a network connection, a network transfer protocol, HTML, DHTML, JavaScript, Dojo, Ruby, Rails, other suitable applications, or any suitable combination thereof.

Figure 16:
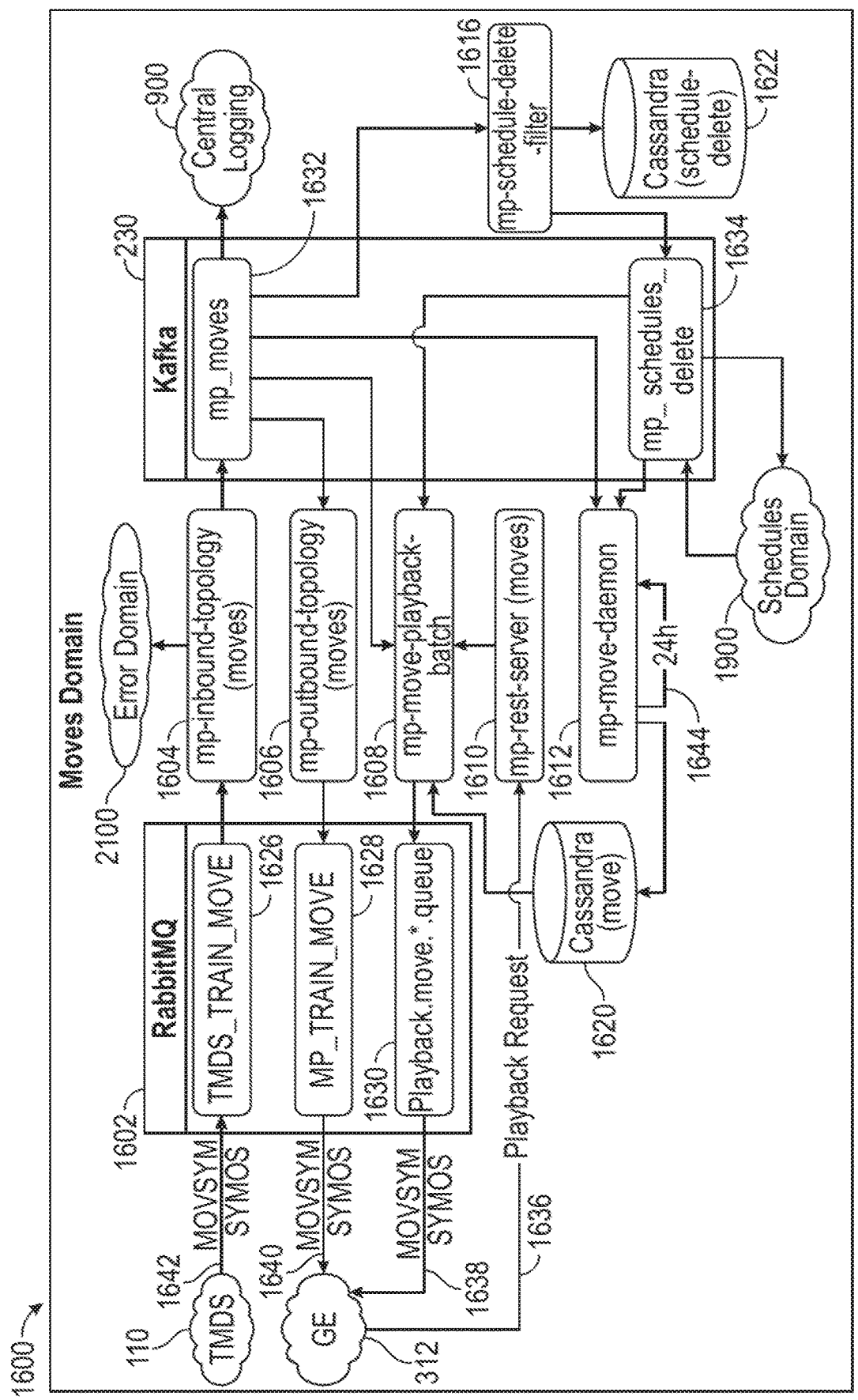
FIG. 16 illustrates an exemplary moves domain of a playback and snapshot system in accordance with one or more exemplary embodiments of the present disclosure.

FIG. 16 illustrates an exemplary moves domain 1600 of a playback and snapshot system in accordance with one or more exemplary embodiments of the present disclosure. The moves domain 1600 can include a TMDS 110, a GE system 312, a RabbitMQ container 1602, a moves mp-inbound-topology 1604, a moves mp-outbound-topology 1606, a mp-move-playback-batch 1608, a moves mp-rest-server 1610, a mp-move-daemon 1612, a moves Cassandra 1620, a Kafka container 230, a mp-schedule-filter 1616, and a schedule-delete Cassandra 1622. The RabbitMQ container 1602 can include a TMDS_TRAIN_MOVE 1626, a MP_TRAIN_MOVE 1628, and a playback.move.*.queue 1630. The Kafka container 230 can include an mp_moves 1632.

The moves domain 1600 can be implemented in control logic, an algorithm on a server, a machine learning module, or other suitable system. The moves domain 1600 can be implemented with software, hardware, an application programming interface (API), a network connection, a network transfer protocol, HTML, DHTML, JavaScript, Dojo, Ruby, Rails, other suitable applications, or any suitable combination thereof.

The TMDS system 110 can send a package 1642 with at least one of a MOVSYM message and a SYMOS message to the TMDS_TRAIN_MOVE 1626. The GE system 312 can send a playback request 1636 to the moves mp-rest-server 1610. The GE system 312 can receive a package 1638 from the playback.move.*.queue 1630 and a package 1640 from the MP_TRAIN_MOVE 1628. Both package 1638 and 1640 could include at least one of a MOVSYM message and a SYMOS message.

The moves mp-inbound-topology 1604 transmits an output to the error domain 2100. The mp_moves 1632 transmits an output to the central logging 900. The mp_schedules_delete 1634 can receive inputs and transmits can output with the schedules domain 1900.

Figure 17:
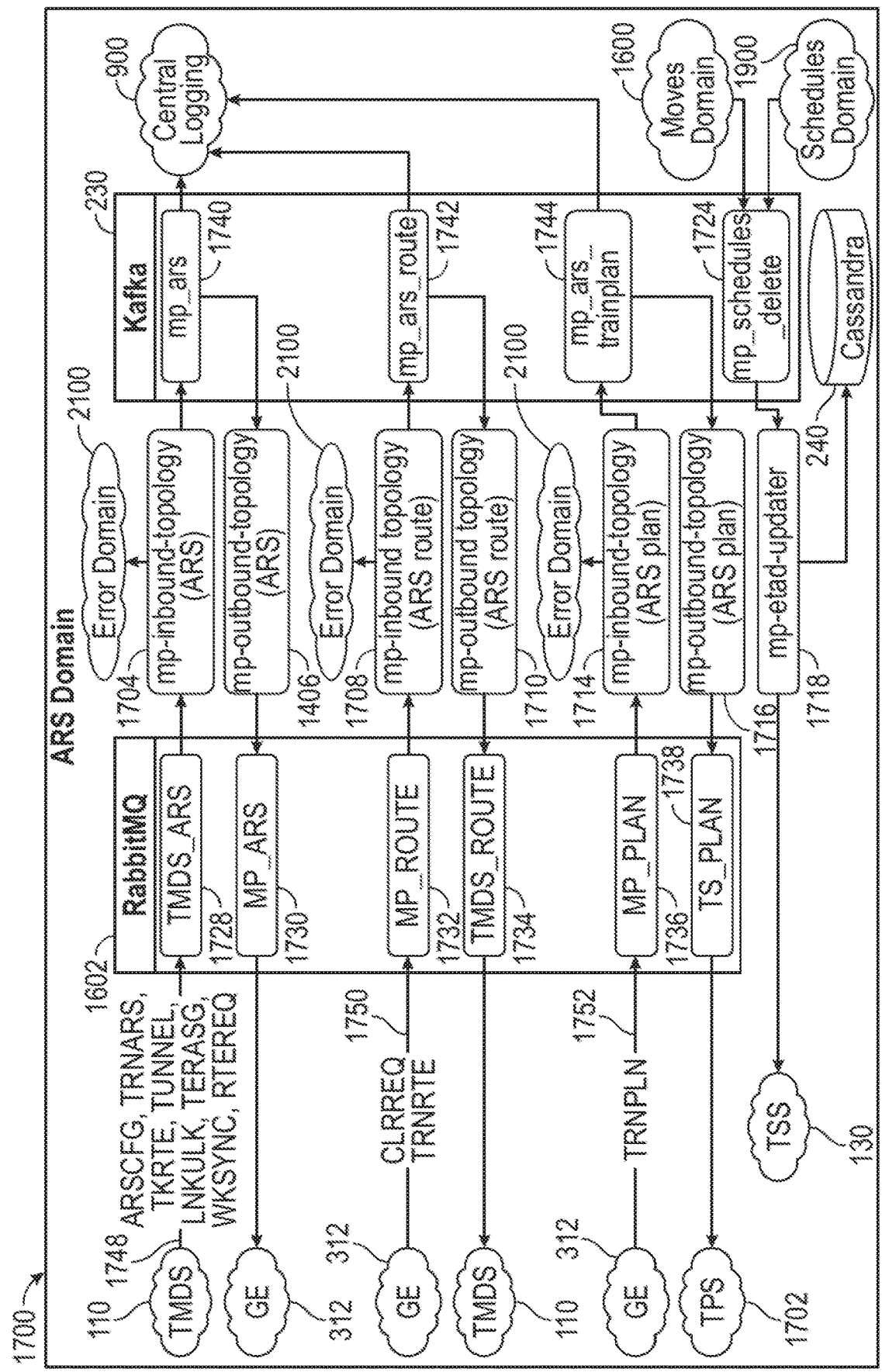
FIG. 17 illustrates an exemplary ARS domain of a playback and snapshot system in accordance with one or more exemplary embodiments of the present disclosure.

FIG. 17 illustrates an exemplary ARS domain 1700 of a playback and snapshot system in accordance with one or more exemplary embodiments of the present disclosure. The ARS domain 1700 can include a TMDS system 110, a GE system 312, a RabbitMQ container 1602, an ARS mp-inbound-topology 104, an ARS mp-outbound-topology 1406, an ARS route mp-inbound topology 1708, an ARS route mp-outbound-topology 1710, an ARS plan mp-inbound-topology 1714, an ARS plan mp-outbound-topology 116, an mp-etad-updater 1718, a Kafka container 230, and a Cassandra 240. The RabbitMQ container 1602 can include a TMDS_ARS 1728, an MP_ARS 1730, an MP_ROUTE 1732, a TMDS_ROUTE 1734, an MP_PLAN 1736, and a TS_PLAN 1738. The Kafka container 230 can include an mp_ars 1740, an mp_ars_route 1742, an mp_are_trainplan 1744, and an mp_schedules_delete 1724.

The ARS domain 1700 can be implemented in control logic, an algorithm on a server, a machine learning module, or other suitable system. The ARS domain 1700 can be implemented with software, hardware, an application programming interface (API), a network connection, a network transfer protocol, HTML, DHTML, JavaScript, Dojo, Ruby, Rails, other suitable applications, or any suitable combination thereof.

The TMDS system 110 can output a package 1748 to the TMDS_ARS 1728, where the package 1748 can include one of an ARSCFG message, a TRNARS message, a TKRTE message, a TUNNEL message, a LNKULK message, a TERASG message, a WKSYNC message, and a RTEREQ message. The GE system 312 can output a package 1750 to the MP_ROUTE 1732, where the package 1750 can include one of a CLRREQ message and a TRNRTE message. The GE system 312 can output a package 1752 to the MP_PLAN 1736, where the package 1752 can include TRNPLN message.

The ARS mp-inbound-topology 1704, the ARS route mp-inbound-topology 1708, and the ARS plan mp-inbound-topology 1714 each output to the error domain 2100. The mp_ars 1740, the mp_ars_route 1742, and the mp_ars_train-plan 1744 each output to the central logging 900. The mp_schedules_delete 1724 can receive inputs from the moves domain 1600 and the schedules domain 1900.

Figure 18:
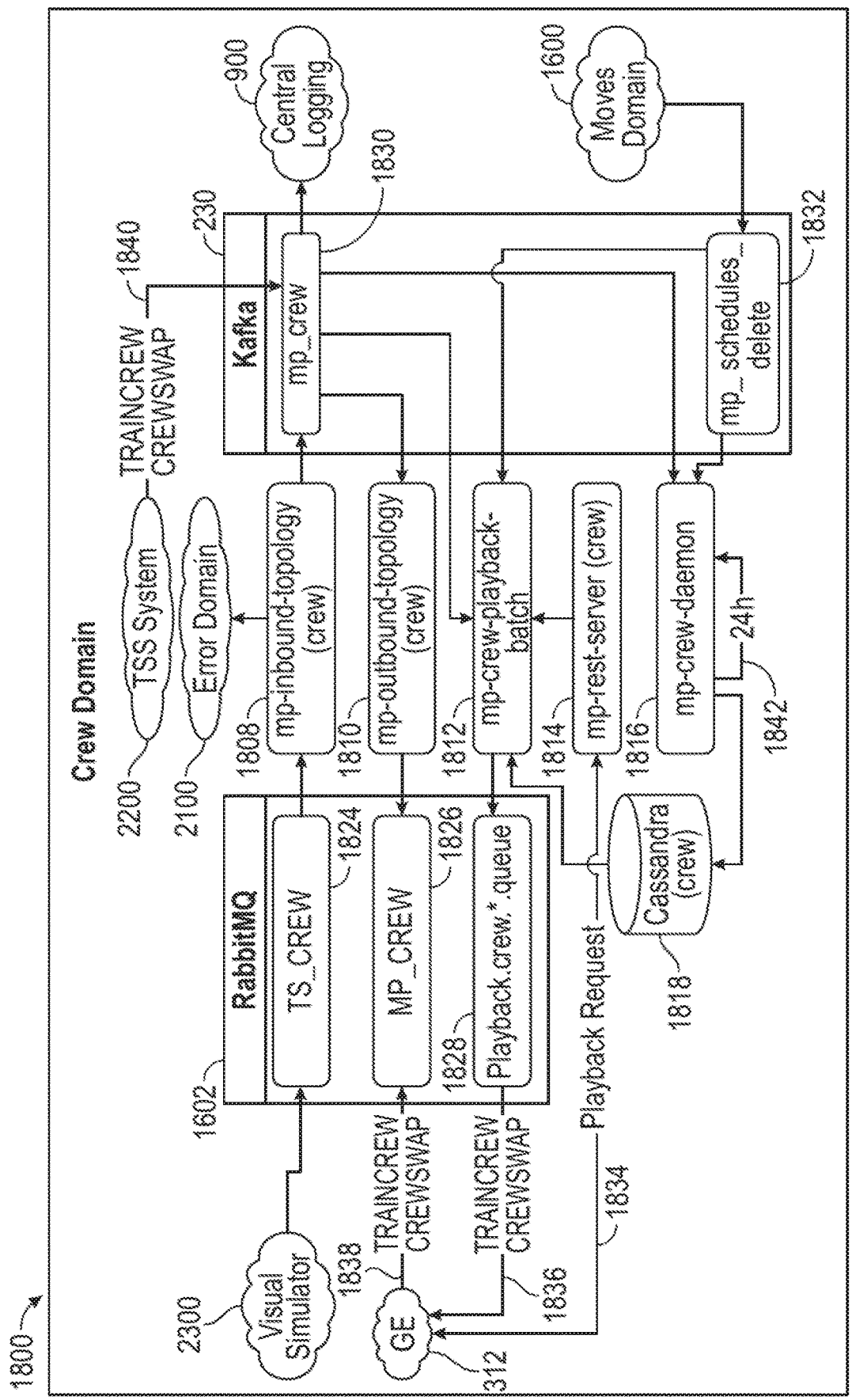
FIG. 18 illustrates an exemplary crew domain of a playback and snapshot system in accordance with one or more exemplary embodiments of the present disclosure.

FIG. 18 illustrates an exemplary crew domain 1800 of a playback and snapshot system in accordance with one or more exemplary embodiments of the present disclosure. The crew domain 1800 can include a RabbitMQ 1602, a crew mp-inbound-topology 1808, a crew mp-outbound-topology 1810, an mp-crew-playback-batch 1812, a crew mp-rest-server 1814, an mp-crew-daemon 1816, a crew Cassandra 1818, and a Kafka container 230. The RabbitMQ 1602 can include a TS_CREW 1824, a MP_CREW 1826, and a playback.crew.*.queue 1828. The Kafka container 230 can include an mp_crew 1830 and a mp_schedules_delete 1832.

The crew domain 1800 can be implemented in control logic, an algorithm on a server, a machine learning module, or other suitable system. The crew domain 1800 can be implemented with software, hardware, an application programming interface (API), a network connection, a network transfer protocol, HTML, DHTML, JavaScript, Dojo, Ruby, Rails, other suitable applications, or any suitable combination thereof.

The GE system 312 can receive a package 1836 from the playback.crew.*.queue 1828 and a package 1838 from the mp_crew 1826, where each of the packages 1836 and 1838 can include at least one of a TRAINCREW message and a CREWSWAP message. The mp-crew 1830 can receive a package 1840 from the TSS domain 2200, where the package 1840 can include at least one of a TRAINCREW message and a CREWSWAP message.

In a testing/evaluation environment, the TS_CREW 1824 can receive inputs from the visual simulator 2300. The crew mp-inbound-topology can output to the error domain 2100. The mp_crew can output to the central logging 900. The mp_schedules_delete 1832 can receive inputs from the moves domain 1600.

Figure 19A:
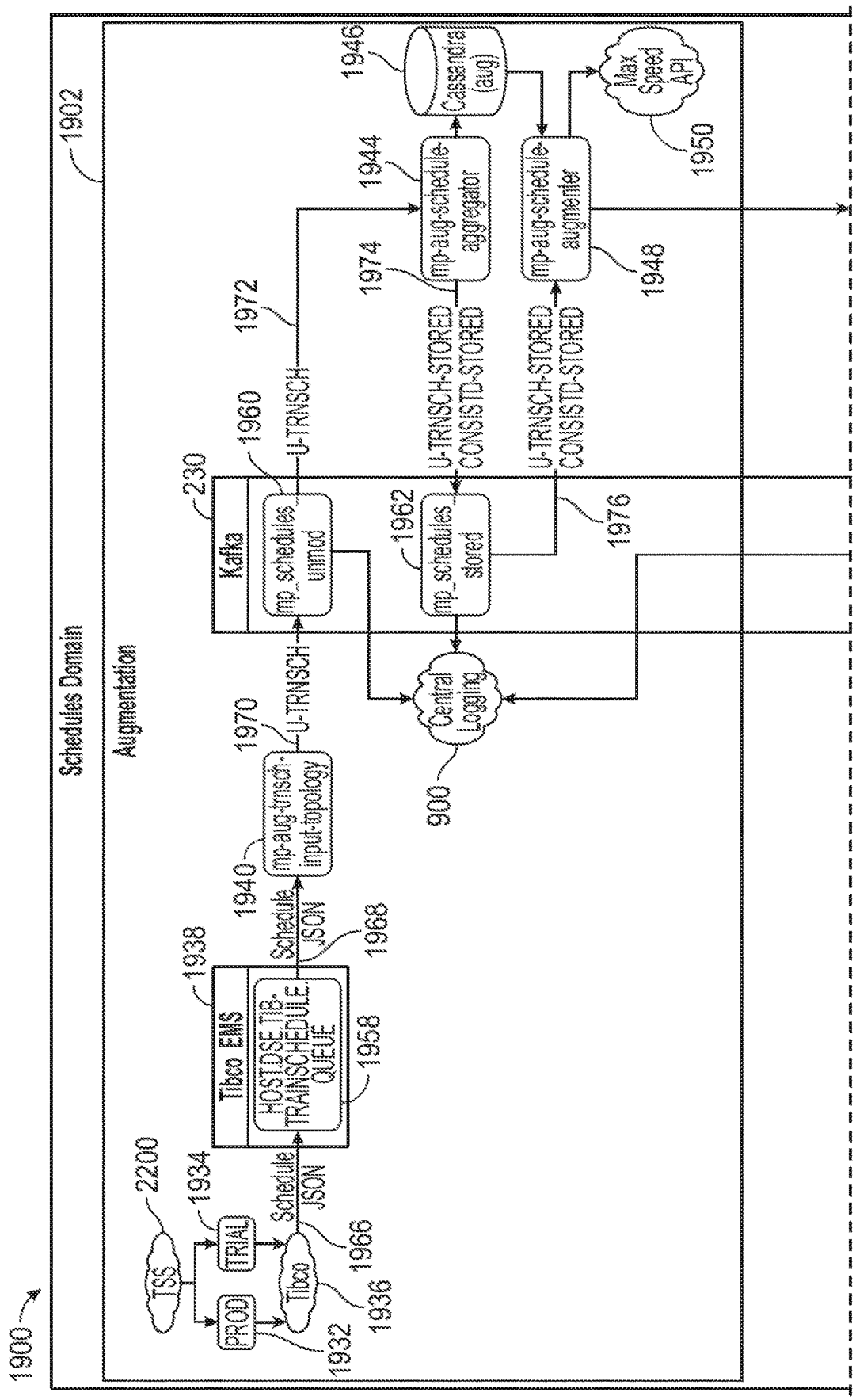
FIGS. 19A and 19B illustrate an exemplary schedules domain of a playback and snapshot system in accordance with one or more exemplary embodiments of the present disclosure.
Figure 19B:
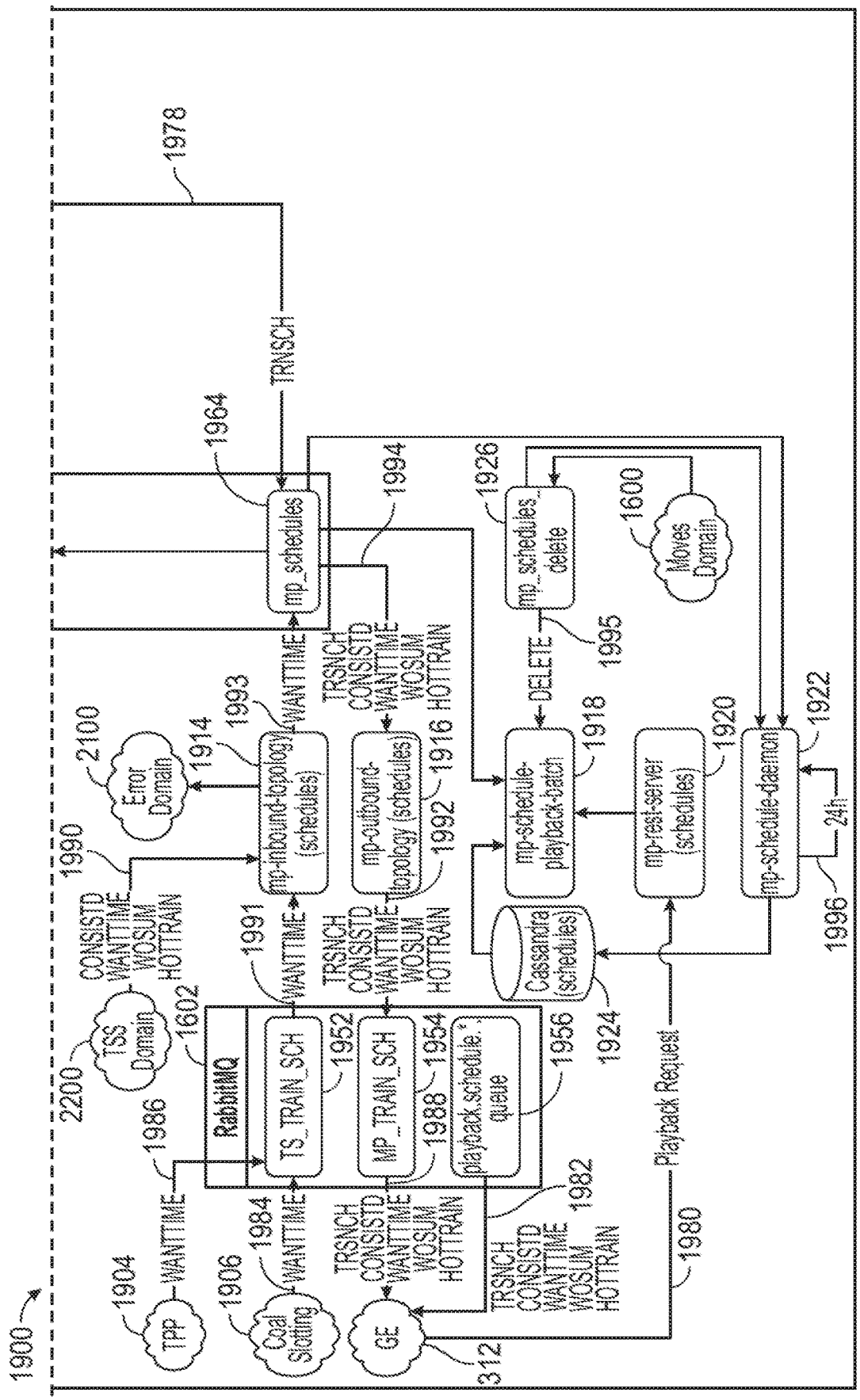

FIGS. 19A and 19B illustrate an exemplary schedules domain 1900 of a playback and snapshot system in accordance with one or more exemplary embodiments of the present disclosure. The schedules domain 1900 can include an augmentation section 1902, a RabbitMQ 1602, a schedules mp-inbound-topology 1993, a schedules mp-outbound-topology 1916, an mp-schedule-playback-batch 1918, a schedules mp-rest-server 1920, a schedules Cassandra 1924, an mp_schedules 1964, and an mp schedule delete 1926. The RabbitMQ 1602 can include a TS_TRAIN_SCH 1952, a MP_TRAIN_SCH 1954, and a playback.schedule.*.queue 1956.

The schedules domain 1900 can be implemented in control logic, an algorithm on a server, a machine learning module, or other suitable system. The schedules domain 1900 can be implemented with software, hardware, an application programming interface (API), a network connection, a network transfer protocol, HTML, DHTML, JavaScript, Dojo, Ruby, Rails, other suitable applications, or any suitable combination thereof.

The Augmentation section 1902 can include a PROD 1932, a TRIAL 1934, a Tibco EMS 1938 including a HOST.DSE.TIB-TRANSCHEDULE.QUEUE 1958, an mp-aug-trnsch-input-topology 1940, an mp aug-schedule-aggregator 1944, an mp-aug-schedule-augmenter 1948, an aug Cassandra 1946, and a Kafka 230 including an mp_schedules_unmod 1960, an mp_schedules_stored 1962, and the mp_schedules 1964.

The GE system 312 transmits a playback request 1980 to the schedules mp-rest-server 1920. The TS_TRAIN_SCH 1952 can receive a WANTTIME message 1986 from the TPP system 1904 and a WANTTIME message 1984 from the Coal Slotting 1906. The TS_TRAIN_SCH send a WANTTIME message 1991 to the schedules mp-inbound-topology 1914. The schedules mp-inbound-topology 1914 can send a WANTTIME message 1993 to the mp_schedules 1964. The mp_schedules 1964 can receive a TRNSCH message 1978 from the mp-aug-schedule augmenter 1948. The schedules mp-inbound-topology 1914 can output information to the error domain 2100.

The GE system can receive a package 1988 from the MP_TRAIN_SCH 1954 and a package 1982 from the playback.schedule.*.queue 1956. The packages 1982 and 1988 can both include at least one of a TRSNCH message, a CONSISTD message, a WANTTIME message, a WOSSUM message, and a HOTTRAIN message. The MP_TRAIN_SCH 1954 can receive a package 1992 from the schedules mp-outbound-topology 1916, where the package 1992 can can include at least one of a TRSNCH message, a CONSISTD message, a WANTTIME message, a WOSSUM message, and a HOTTRAIN message.

The mp_schedules_delete can receive inputs from the moves domain 1600. The mp_schedules_delete 1926 transmits a DELETE message 1995 to the mp-schedule-playback-batch.

The TSS system 2200 can output to the PROD 1932 and the TRIAL 1934, which both output to the Tibco 1936. The Tibco 1936 can provide a package 1966 to the HOST.DSE.TIB-TRAINSCHEDULE.QUEUE 1958, where the package 1966 can include at least one of a SCHEDULE message in the JSON format. The HOST.DSE.TIB-TRAINSCHEDULE.QUEUE 1958 can output a package 1968 to the mp-aug-trnsch-input-topology 1940, where the package 1968 can include at least one of a SCHEDULE message in the SON format. The mp-aug-trnsch-input-topology 1940 can output a U-TRNSCH message 1970 to the mp_schedules_unmod 1960. The mp_schedules_unmod 1960 can output to the central logging 900 and can output a U-TRNSCH message 1972 to the mp-aug-schedule-aggregator 1944. The mp-aug-schedule-aggregator 1944 can output a package 1974 to the mp_schedules_stored 1962, where the package 1974 can include at least one a U-TRNSCH-STORED message and a CONSISTD-STORED message. The mp_schedules_stored 1962 can send a package 1976 to the mp-aug-schedule-augmenter 1948, where the package 1976 can include at least one a U-TRNSCH-STORED message and a CONSISTD-STORED message. The mp-aug-schedule-augmenter 1948 can output to a max speed API 1950.

Figure 20:
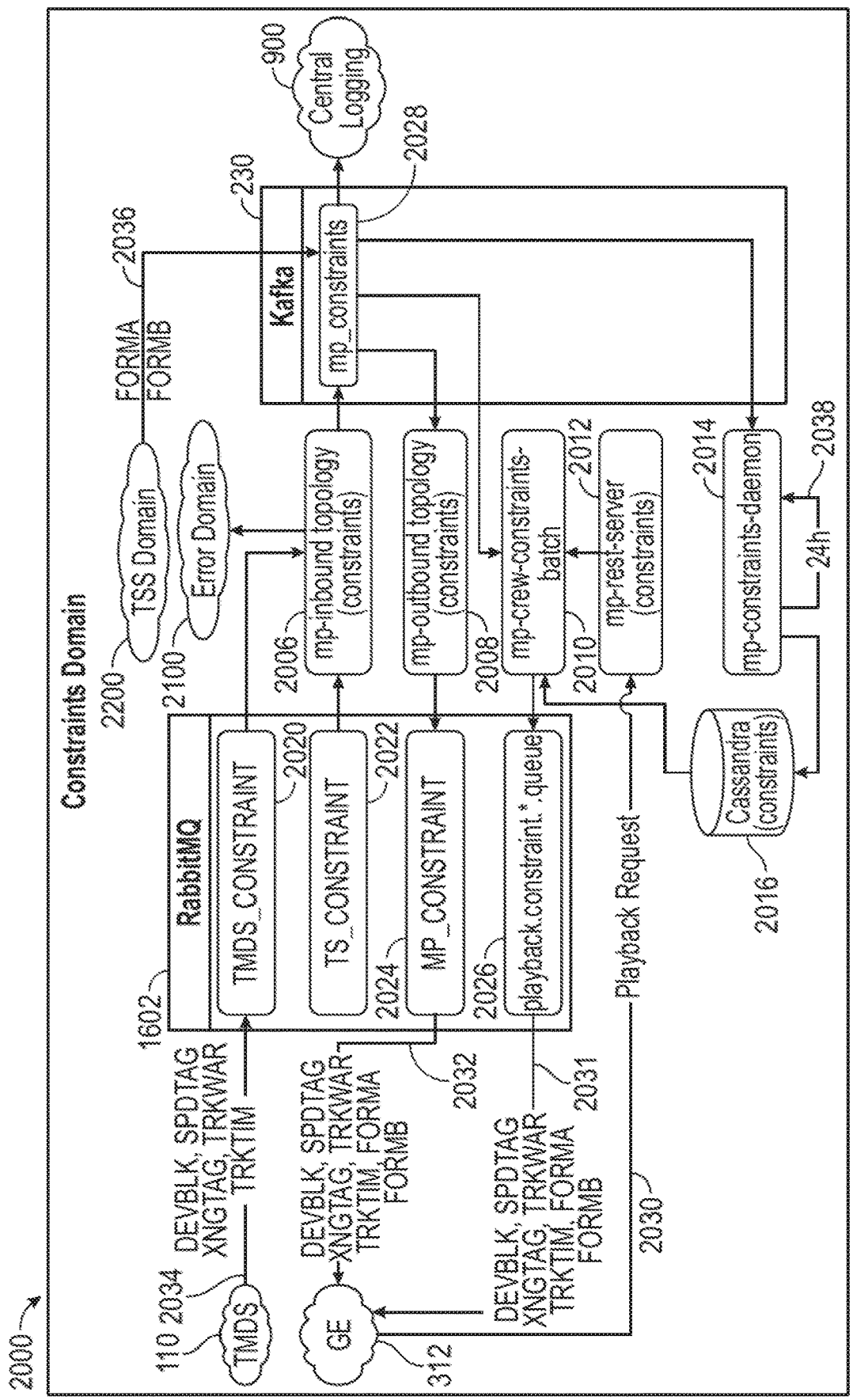
FIG. 20 illustrates an exemplary constraints domain of a playback and snapshot system in accordance with one or more exemplary embodiments of the present disclosure.

FIG. 20 illustrates an exemplary constraints domain 2000 of a playback and snapshot system in accordance with one or more exemplary embodiments of the present disclosure. The constraints domain 2000 can include a RabbitMQ 1602, a Kafka 230, a constraints mp-inbound-topology 2006, a constraints mp-outbound-topology 2008, a mp-crew-constraints-batch 2010, a constraints mp-rest-server 2012, an mp-constraints-daemon 2014, and a constraints Cassandra 2016. The RabbitMQ 1602 can include a TMDS_CON- STRAINT 2020, a TS_CONSTRAINT 2022, an MP_CONSTRAINT 2024, and a playback.constraint.*.queue. The Kafka 230 can include an mp constraints 2028.

The constraints domain 2000 can be implemented in control logic, an algorithm on a server, a machine learning module, or other suitable system. The constraints domain 2000 can be implemented with software, hardware, an application programming interface (API), a network connection, a network transfer protocol, HTML, DHTML, JavaScript, Dojo, Ruby, Rails, other suitable applications, or any suitable combination thereof.

The TMDS system 110 can output a package 2034 to the TMDS_CONSTRAINT 2020, where the package 2034 can include at least one of a DEVBLK message, a SPDTAG message, a XNGTAG message, a TRKWAR message, and a TRKTIM message. The GE system 312 can receive a package 2032 from the MP_CONSTRAINT 2024 and a package 2031 from the playback.constraint.*.queue 2026. Each of the packages 2032 and 2034 can include at least one of a DEVBLK message, a SPDTAG message, a XNGTAG message, a TRKWAR message, a TRKTIM message, a FORMA message, and a FORMB message. The mp constraints 2028 can receive a package 2036 from the TSS domain 2200, where the package 2036 can include at least one of a FORMA message and a FORMB message. The mp-inbound topology 2006 can output to the error domain 2100. The mp constraints can output to the central logging 900.

Figure 21:
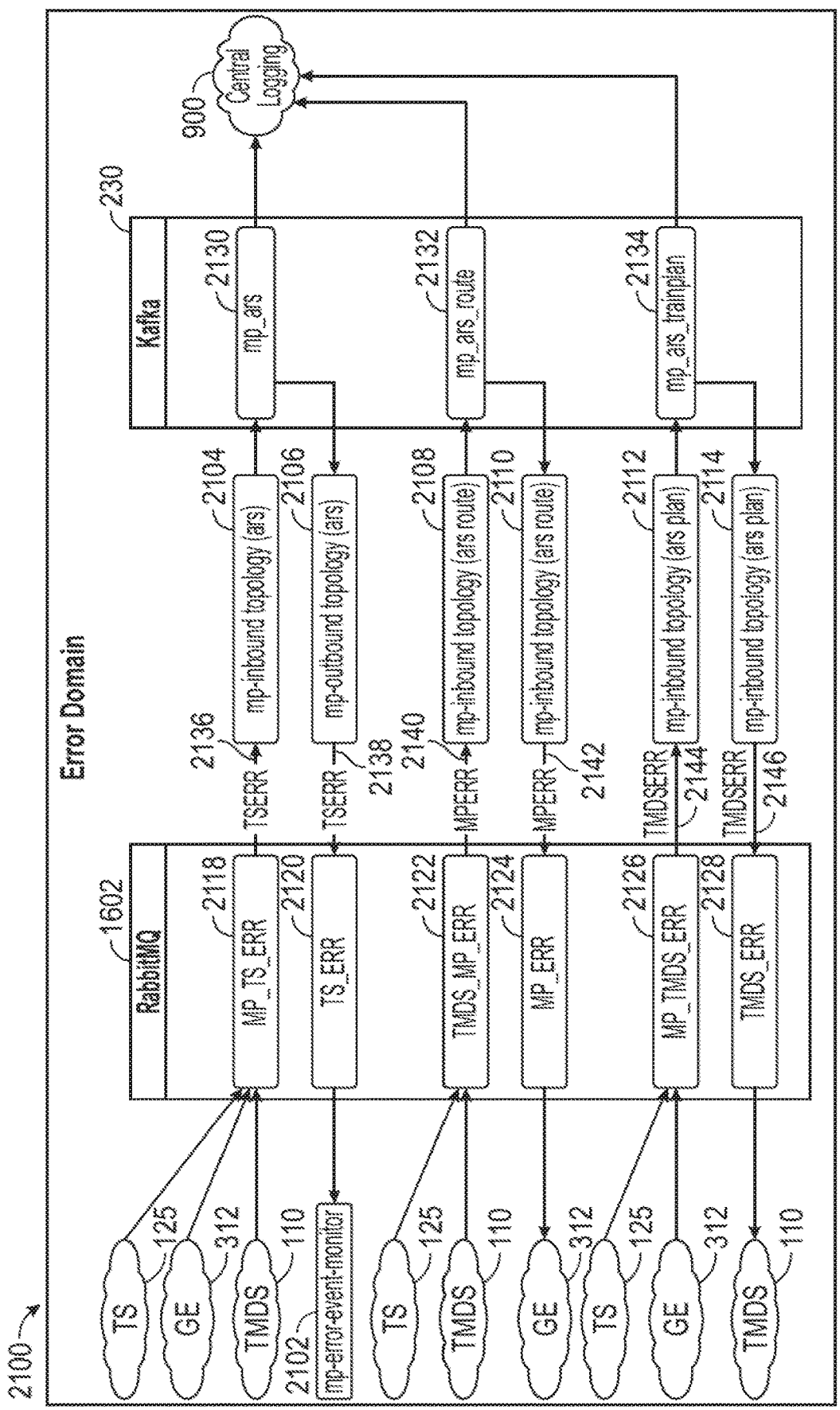
FIG. 21 illustrates an exemplary error domain of a playback and snapshot system in accordance with one or more exemplary embodiments of the present disclosure.

FIG. 21 illustrates an exemplary error domain 2100 of a playback and snapshot system in accordance with one or more exemplary embodiments of the present disclosure. The error domain 2100 can include a RabbitMQ 1602, an ars mp-inbound-topology 2104, an ars mp-outbound topology 2106, an ars route mp-inbound-topology 2108, an ars route mp-outbound-topology 2110, an ars plan mp-inbound-topology 2112, and an ars plan mp-outbound-topology. The RabbitMQ 1602 can include an MP_TS_ERR 2118, a TS_ERR 2120, a TMDS_MP_ERR 2122, an MP_ERR 2124, a MP_TMDS_ERR 2126, a TMDS_ERR 2128. The Kafka 230 can include an mp_ars 2130, an mp_ars_route 2132, and an mp_ars_trainplan 2134.

The error domain 2100 can be implemented in control logic, an algorithm on a server, a machine learning module, or other suitable system. The error domain 2100 can be implemented with software, hardware, an application programming interface (API), a network connection, a network transfer protocol, HTML, DHTML, JavaScript, Dojo, Ruby, Rails, other suitable applications, or any suitable combination thereof.

The TS system 125, the GE system 312, and the TMDS system 110 each input to the MP_TS_ERR 2118. The TS system 125 and the TMDS system 110 each input to the TMDS_MP_ERR 2122. The MP_ERR 2124 can output to the GE system 312. The TS system 125 and the GE system 312 each input to the MP_TMDS_ERR 2126. The TMDS_ERR 2128 can output to the TMDS system 110.

The MP_TS_ERR 2118 can output a TSERR message 2136 to the ars mp-inbound-topology 2104. The ars mp-outbound-topology 2106 can output a TSERR message 2138 to the TS_ERR, which can output to the mp-error-event-monitor 2102. The TMDS_MP_ERR can output an MPERR message 2140 to the ars route mp-inbound-topology 2018. The ars route mp-outbound-topology 2110 can output an MPERR message 2142 to the MP_ERR. The MP_TMDS_ERR 2126 can output a TMDSERR message 2144 to the ars plan mp-inbound-topology 2112. The ars plan mp-outbound-topology 2114 can output a TMDSERR message 2146 to the TMDS_ERR. The mp_ars 2130, mp_ars_route 2132, mp_ars_trainplan 2134 each can output to the central logging 900.

Figure 22:
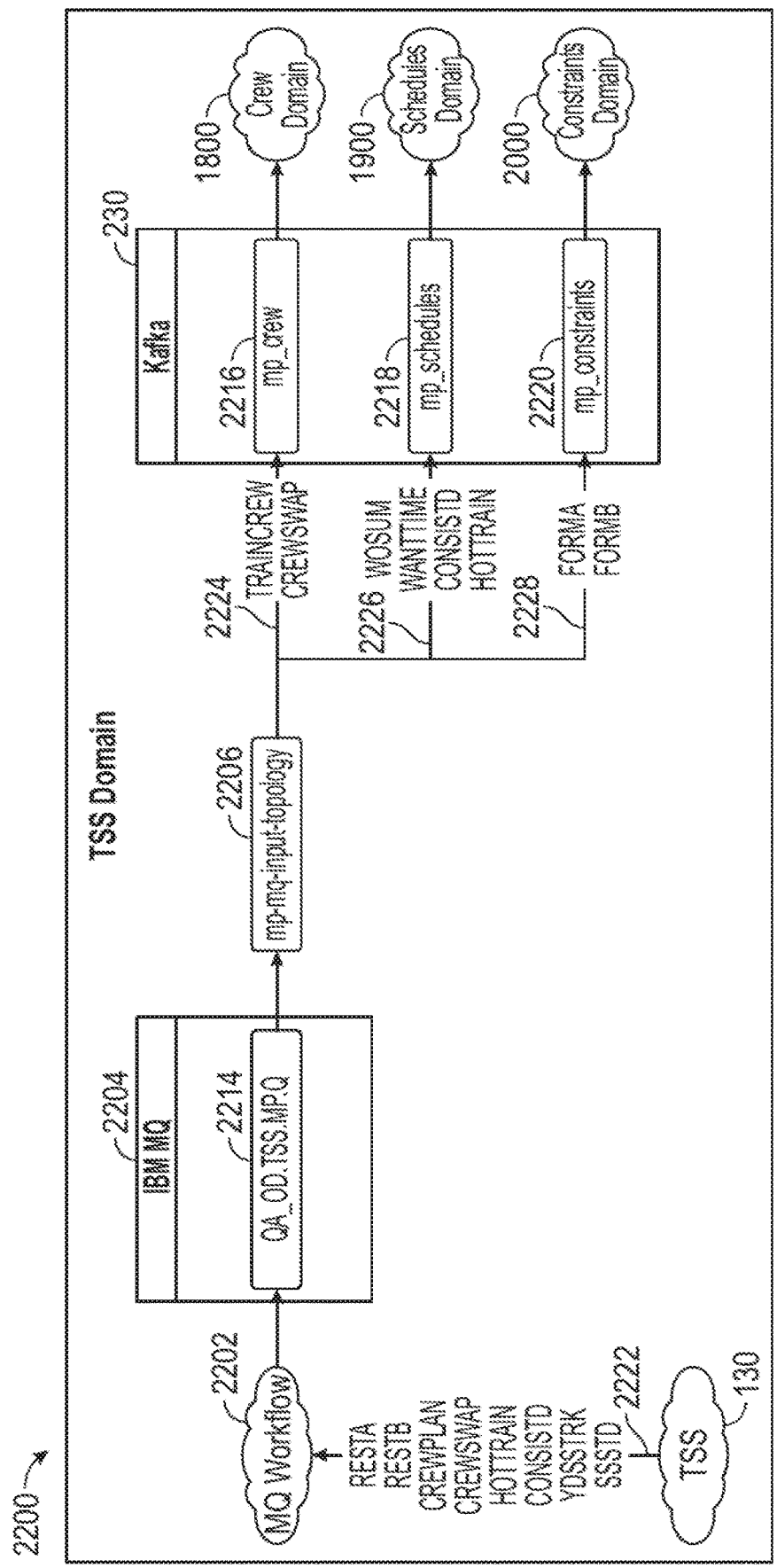
FIG. 22 illustrates an exemplary TSS domain of a playback and snapshot system in accordance with one or more exemplary embodiments of the present disclosure.

FIG. 22 illustrates an exemplary TSS domain 2200 of a playback and snapshot system in accordance with one or more exemplary embodiments of the present disclosure. The TSS domain can include an IBM MQ 2204 with a QA_OD.TSS.NIP.Q 2214, an mp-mq-input-topology 2206, and a Kafka 230. The Kafka 230 can include an mp_crew 2216, a mp_schedules 2218, and an mp constraints 2220.

The TSS domain 2200 can be implemented in control logic, an algorithm on a server, a machine learning module, or other suitable system. The TSS domain 2200 can be implemented with software, hardware, an application programming interface (API), a network connection, a network transfer protocol, HTML, DHTML, JavaScript, Dojo, Ruby, Rails, other suitable applications, or any suitable combination thereof.

The TSS system 130 can output a package 2222 to the MQ Workflow system 2202, where the package 2222 can include at least one of a RESTA message, a RESTB message, a CREWPLAN message, a CREWSWAP message, a HOTTRAIN message, a CONSISTD message, a YDSSTRK message, and a SSSTD message. The mp-mq-input-topology 2206 can output a package 2224 to the mp_crew 2216 for output to the crew domain 1800, a package 2226 to the mp_schedules for output to the schedules domain 1900, and a package 2228 to the mp_constraints 2220 for output to the constraints domain 2000. The package 2224 can include at least one of a TRAINCREW message and a CREWSWAP message. The package 2226 can include at least one of a WOSUM message, a WANTTIME message, a CONSISTD message and a HOTTRAIN message. The package 2228 can include at least one of a FORMA message and a FORMB message.

Figure 23A:
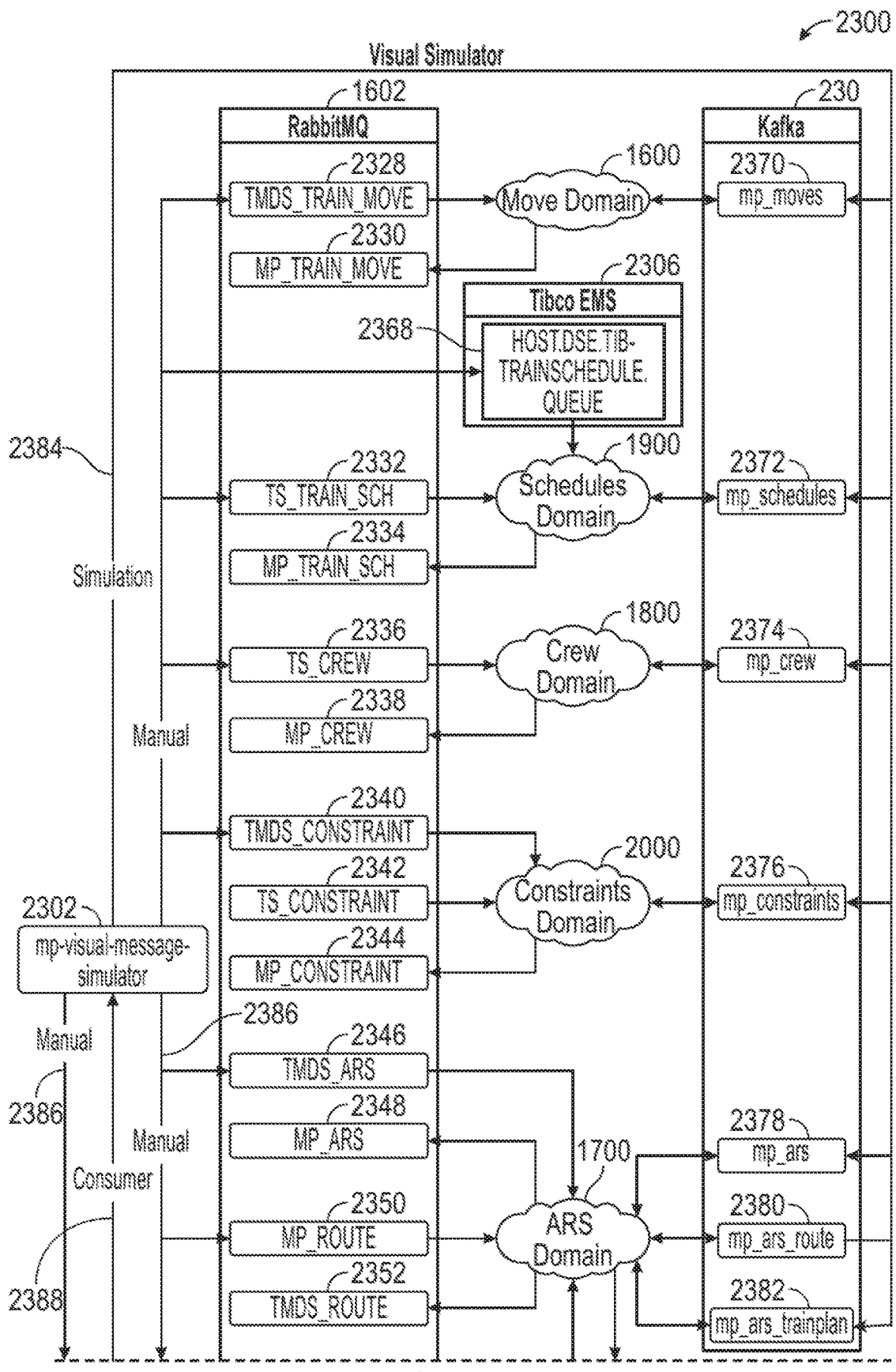
FIGS. 23A and 23B illustrate an exemplary visual simulator of a playback and snapshot system in accordance with one or more exemplary embodiments of the present disclosure.
Figure 23B:
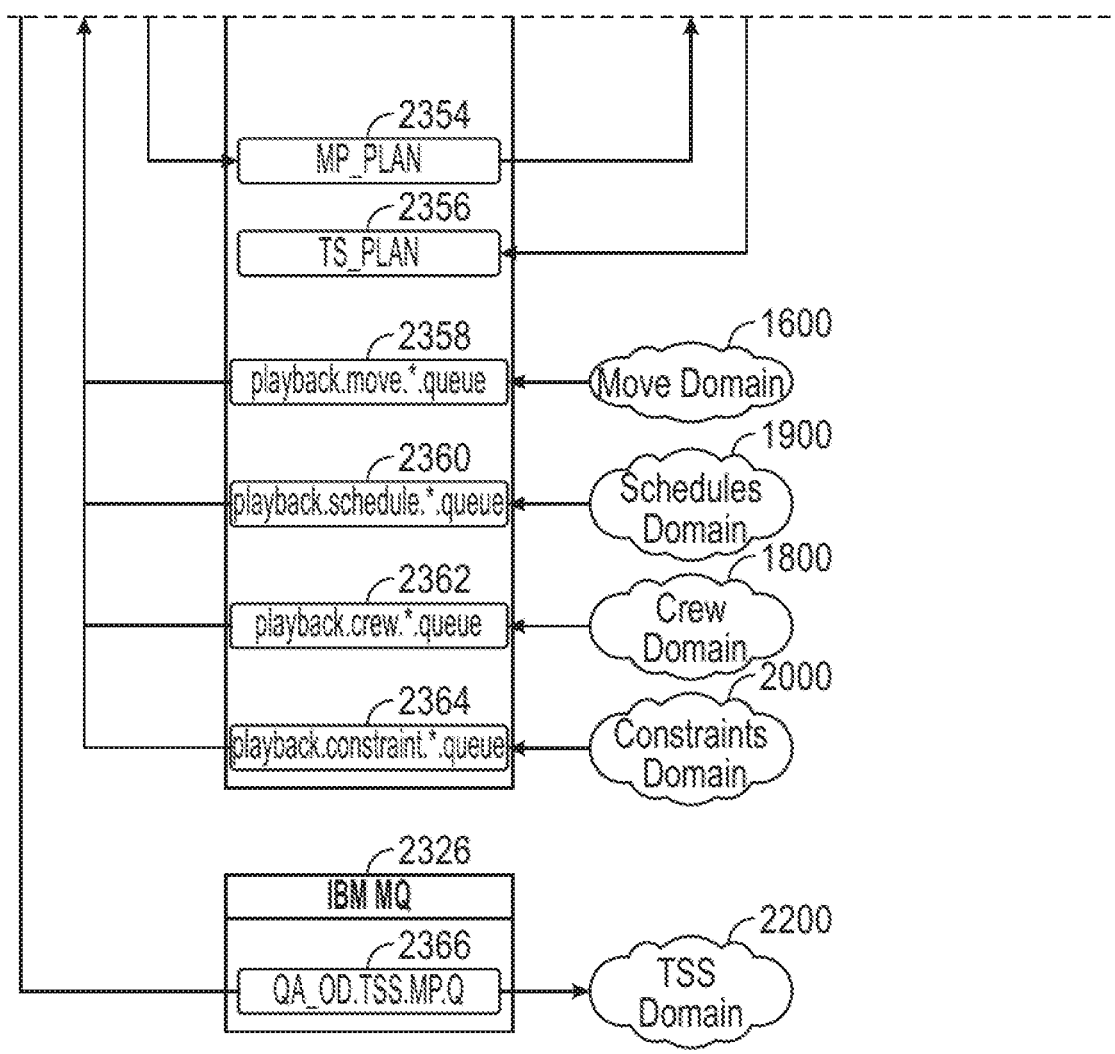

FIGS. 23A and 23B illustrate an exemplary visual simulator 2300 of a playback and snapshot system in accordance with one or more exemplary embodiments of the present disclosure. For testing/evaluation purposes, the visual simulator 2300 can include a mp-visual-message-simulator 2302 a RabbitMQ 1602, a Tibco EMS 2306 with a HOST.DSE.TIB-TRAINSCHEDULE.QUEUE 2368, a Kafka 230, and a IBM MQ 2326 with a QA_OD.TSS.MP.Q 2366. The RabbitMQ 1602 can include a TMDS_TRAIN_MOVE 2328, an MP_TRAIN_MOVE 2330, a TS_TRAIN_SCH 2332, an MP_TRAIN_SCH 2334, a TS_CREW 2336, an MP_CREW 2338, a TMDS_CONSTRAINT 2340, a TS_CONSTRAINT 2343, an MP_CONSTRAINT 2344, a TMDS_ARS 2346, an MP_ARS 2348, an MP_ROUTE 2350, a TMDS_ROUTE 2352, an MP_PLAN 2354, a TS_PLAN 2356, a playback.move.*.queue 2358, a playback.schedule.*.queue 2360, a playback.crew.*.queue 2362, a playback.constraint.*.queue 2364. The Kafka 230 can include an mp_moves 2370, an mp_schedules 2372, an mp_crew 2374, an mp_constraints 2376, an mp_ars 2378, an mp_ars_route 2380, an mp_ars_trainplan 2382.

The visual simulator 2300 can be implemented in control logic, an algorithm on a server, a machine learning module, or other suitable system. The visual simulator 2300 can be implemented with software, hardware, an application programming interface (API), a network connection, a network transfer protocol, HTML, DHTML, JavaScript, Dojo, Ruby, Rails, other suitable applications, or any suitable combination thereof.

The mp-visual-message-simulator 2302 can receive a consumer message 2388 from the playback.move.*.queue 2358, the playback.schedule.*.queue 2360, the playback.crew.*.queue 2362, and the playback.constraint.*.queue 2364. The mp-visual-message-simulator 2302 can output a manual message 2386 to the TMDS_TRAIN_MOVE 2328, the HOST.DSE.TIB-TRAINSCHEDULE.QUEUE 2368, the TS_TRAIN_SCH 2332, the TS_CREW 2336, the TMDS_CONSTRAINT 2340, the TS_CONSTRAINT 2343, the TMDS_ARS 2346, the MP_ROUTE 2350, the MP_PLAN 2354 and the QA_OD.TSS.MP.Q 2366. The mp-visual-message-simulator 2302 can output a simulation message 2384 to the mp_moves 2370, the mp_schedules 2372, the mp_crew 2374, the mp_constraints 2376, the mp_ars 2378, the mp_ars_route 2380, and the mp_ars_trainplan 2382.

The move domain 1600 can provide inputs to the playback.move.*.queue 2358. The schedules domain 1900 can provide inputs to the playback.schedule.*.queue 2360. The crew domain 1800 can provide inputs to the playback.crew.*.queue 23628. The constraints domain 2000 can provide inputs to the playback.constraints.*.queue 2364.

The QA_OD.TSS.MP.Q 2366 can output to the TSS domain 2200. The moves domain 1600 can provide inputs to the MP_TRAIN_MOVE 2330, can receive can output from the TMDS_TRAIN_MOVE 2328, and communicates with the mp_moves 2370. The schedules domain 1900 can provide inputs to the MP_TRAIN_SCH 2334, can receive can output from the TS_TRAIN_SCH 2332, and communicates with the mp_schedules 2372. The crew domain 1800 can provide inputs to the MP_CREW 2338, can receive can output from the TS_CREW 2336, and communicates with the mp_crew 2374. The constraints domain 2000 can provide inputs to the MP_CONSTRAINTS 2344, can receive can output from the TMDS_CONSTRAINTS 2340 and the TS CONSTRAINTS 2342, and communicates with the mp_constraints 2376. The ARS domain 1700 can provide inputs to the MP_ARS 2348, the TMDS_ROUTE 2352, and the TS_PLAN 2356; can receive can output from the TMDS_ARS 2346, the MP_ROUTE 2350, and the MP_PLAN 2354, and communicates with the mp_ars 2378, the mp_ars_route 2380, and the mp_ars_trainplan 2382.

FIG. 24A illustrates an event series 2400 in accordance with one or more exemplary embodiments of the present disclosure. The event series 2400 can be a series of events in a rail system capturing the movement of all the trains on a specific track. The events represent a specific time and are ordered based on those times. For example, the first event 2410 occurs at a first time, for example a first hour, and the second event 2410 occurs at a second time, for example a second hour. During the first hour, train A moves from point 1 to point 2, which can be captured in the first event 2410. In the second event 2410, train A moves from point 2 to point 3. In the third event 2414, train b moves from point 1 to point 2. In the fourth event 2416, train A arrives at its destination. In the fifth event, 2418, train B moves from point 2 to point 3.

FIG. 24B illustrates a state management 2401 of the event series 2400 in accordance with one or more exemplary embodiments of the present disclosure. The state of the rail system can consider the events that have previously occurred, particularly trains en route to a destination. The state as of the second time will be referred to as the second state, and so on. At the second state 2420, the first event 2410 and the second event 2412 have occurred. The second state 2420 of the rail system can be that train A moved from point 1 to point 2 and from point 2 to point 3. At the third state 2422, the third event 2414 has occurred. The third state 2422 can be that train A moved from point 1 to point 2 and from point 2 to point 3, and train B has moved from point 1 to point 2. At the fourth state 2424, the fourth event 2416 has occurred and train A has reached its destination. Because train A is no longer en route, the events related to train A drop from the fourth state 2424. The fourth state 2424 can include that Train B moved from point 1 to point 2. At the fifth state 2426, the fifth state 2418 has occurred. The fifth state can include that Train B moved from point 1 to point 2 and from point 2 to point 3.

FIG. 24C illustrates a state management 2402 of the event series 2400 in accordance with one or more exemplary embodiments of the present disclosure. It is not feasible to take snapshots for every event, given the large number of data that would need to be stored. Instead, snapshots can be performed at a predetermined interval. The predetermined interval can be defined by a user, based on system analytics, or system signaling. State management 2402 shows only two snapshots, one at t3 and one at t5, to correspond with a reduction in the number of feedbacks due to an increase in interval between snapshots.

Figure 24D:
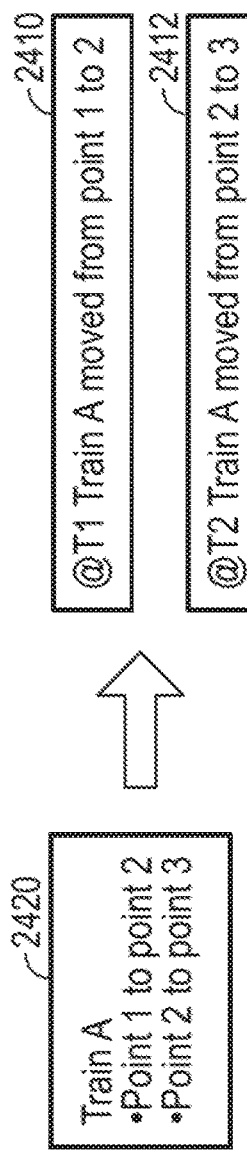

FIG. 24D illustrates a state management 2402 of the event series 2400 in accordance with one or more exemplary embodiments of the present disclosure. Given that only snapshots at T3 and T5 are provided from FIG. 24C, the state of the system (network) as of T2 can be generated by retrieving data from the stored system events. As there is no previous snapshot, the system must playback from the beginning to T2, to build the state T2. The state can then be deconstructed into the events needed to reproduce that state, by retrieving the events stored in the system. The state T2 2420 can be generated by incorporating the events 2410 and 2412.

Figure 24E:
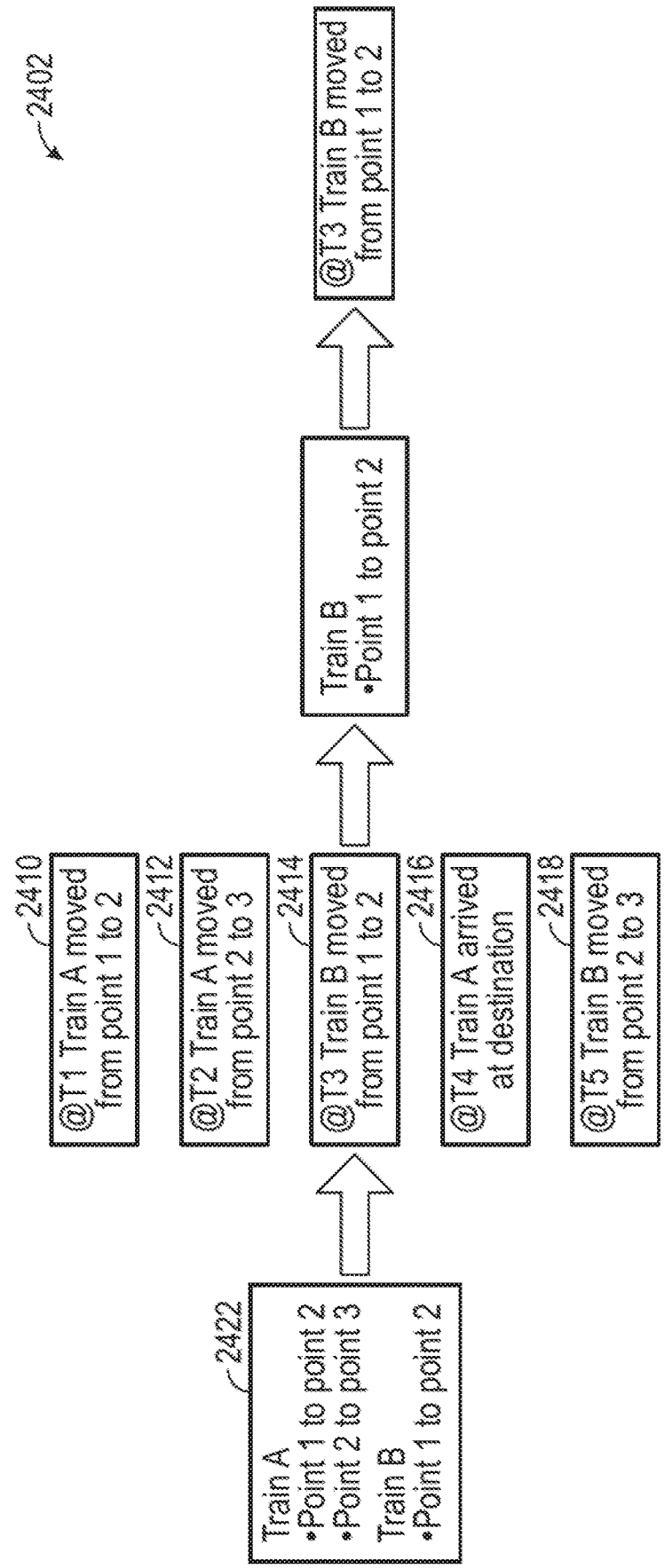

FIG. 24E illustrates a state management 2402 of the event series 2400 in accordance with one or more exemplary embodiments of the present disclosure. Given that only snapshots at T3 and T5 are provided from FIG. 24C, the state of the system (network) as of T4 can be generated by again retrieving data from the stored system events. The closest snapshot to T4 is T3, so snapshot T3 is retrieved from memory at state 2422. The system can then playback the events between T3 2422 and T4, to build the state as of T4. The state can then be deconstructed into the events needed to reproduce that state, by retrieving the events stored in the system. The state T4 can be generated by incorporating the event 2414.

Figure 25:
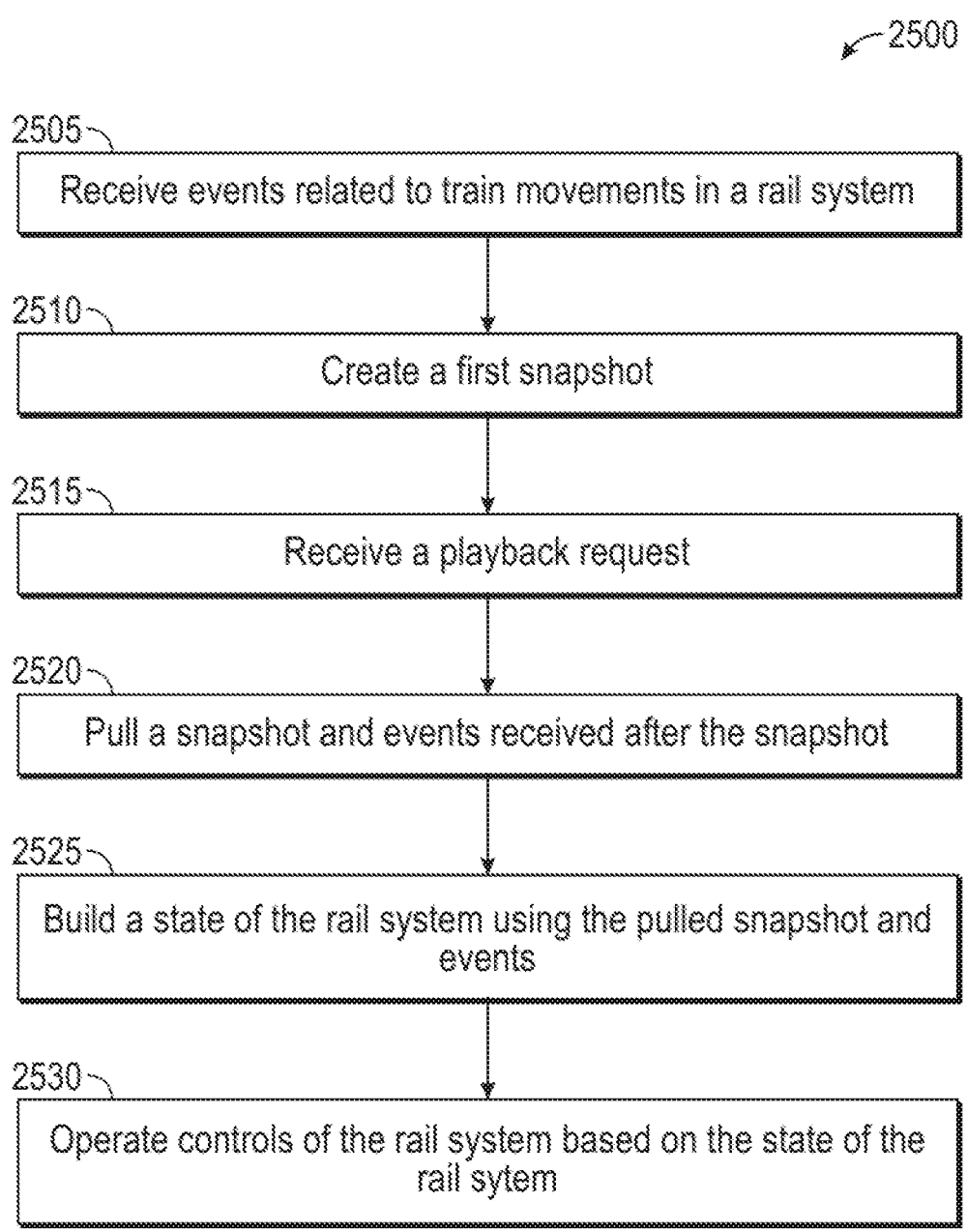
FIG. 25 illustrates an example process for railroad snapshot and playback in accordance with one or more exemplary embodiments of the present disclosure.

FIG. 25 illustrates a flow chart diagram exemplifying control logic 2500 embodying features of a method for a railroad snapshot and playback, in accordance with one or more exemplary embodiments of the present disclosure. The snapshot and playback control logic 2400 can be implemented as an algorithm on a server, a machine learning module, or other suitable system. The snapshot and playback control logic 2500 can be achieved via software, hardware, an application programming interface (API), a network connection, a network transfer protocol, HTML, DHTML, JavaScript, Dojo, Ruby, Rails, other suitable applications, or a suitable combination thereof.

The snapshot and playback control logic 2500 process flow of the present embodiment begins at step 2505, where the control logic can receive a plurality of events related to train movements in a rail system (network). An event can be a detailed description of a train movement at an indicated time. A number of events in the first snapshot can be based on a snapshot increment. The snapshot increment can be an amount of time or a number of events received. The snapshot and playback control logic 2500 can continuously receive events of the rail system (network) as time passes. In another exemplary embodiment, the snapshot and playback control logic 2500 can receive a second plurality of events during a second snapshot increment. In another exemplary embodiment, when an event is received that a train has completed travel or left the rail system (network), the snapshot and playback control logic 2500 can remove any events related to the train from the memory. The control logic then proceeds to step 2510.

At step 2510, the snapshot and playback control logic 2500 can create and store in a memory, a first snapshot that can include the plurality of received events. In another exemplary embodiment, the snapshot and playback control logic 2500 can create a second snapshot for the second plurality of received events. In another exemplary embodiment, a number of events in the first snapshot can correspond to a number of active trains. In another exemplary embodiment, the plurality of events is a detailed description of a train movement at an indicated time. In another exemplary embodiment, the second snapshot of the second plurality of events is created based on one or more events in the second snapshot corresponding to a number of active trains. The control logic then proceeds to step 2515.

At step 2515, the snapshot and playback control logic 2500 can receive a playback request for a playback state of the rail system. A user interface to the snapshot and playback system can receive a playback request from a user or automated system. In one exemplary embodiment, when the first and second snapshots have been created and the playback request is at a current time, the pulled (retrieved) snapshot can be the second snapshot and the events received after the second snapshot. In another exemplary embodiment, when the playback request is a previous time before the second snapshot, the pulled (retrieved) snapshot can be the first snapshot and the pulled (retrieved) events can be events received and stored in the memory between the first snapshot and the previous time. In another exemplary embodiment, when the playback request is a previous time after the second snapshot, the pulled (retrieved) snapshot can be the second snapshot and the pulled events can be events received and stored between the second snapshot and the previous time. The control logic then proceeds to step 2520.

At step 2520, the snapshot and playback control logic 2500 pulls (retrieves) a snapshot stored in the memory and events received and stored in the memory after the snapshot, based on the request. The control logic then proceeds to step 2525.

At step 2525, the snapshot and playback control logic 2500 builds and identify a state of the rail system using the pulled (retrieved) snapshot and the pulled (retrieved) events. The control logic then proceeds to step 2530.

At step 2530, the snapshot and playback control logic 2500 can operate controls of the rail system based on the state of the rail system. The control logic then terminates or awaits a new playback request and can repeat the aforementioned steps.

The present disclosure achieves at least the following advantages:
1. improves the performance of the system by partitioning and analyzing data according to predetermined hierarchies to retrieve railroad states without having to filter or query all of the events stored in the system;
2. reduces the utilization of additional processing resources and network utilization from computationally-expensive data storage, data compression, and system queries;
3. provides a platform for providing easy and efficacious event snapshot storage and playback; and
4. provides metrics that can point to railroad savings or areas for quality improvement.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What can be claimed is:

1. An apparatus for snapshot and playback of events in a rail system, the apparatus comprising:
   at least one memory configured to store events and snapshots related to the rail system; and
   a processor coupled to the memory and configured to:
      receive a plurality of events related to train movements in the rail system,
      create and store in the memory a first snapshot, according to a specific domain and organized in a partitioned hierarchy of one or more topics related to the rail system or domain, that include the plurality of the events, wherein a number of events in the first snapshot corresponds to a number of active trains,
      receive a request for a state of the rail system,
      pull the first snapshot stored in the memory and events received and stored in the memory after the first snapshot based on the request; and identify a state of the rail system using the pulled first snapshot and the pulled events, wherein the state of the rail system comprises a plurality of active events of the plurality of events as of a specific time and organized by a plurality of train symbols.

2. The apparatus of claim 1, wherein each event in the plurality of events is a detailed description of a train movement at an indicated time.

3. The apparatus of claim 1, wherein the processor is further configured to:
receive a second plurality of events, and
create a second snapshot of the second plurality of events based on one or more events in the second snapshot corresponding to a number of active trains.

4. The apparatus of claim 3, wherein, when the request is a current time, the pulled snapshot is the second snapshot instead of the first snapshot, and the pulled events are received and stored in the memory after the second snapshot.

5. The apparatus of claim 3, wherein, when the request is a previous time before the second snapshot, and the pulled events are events received and stored in the memory between the first snapshot and the previous time.

6. The apparatus of claim 3, wherein, when the request is a time after the second snapshot, the pulled snapshot is the second snapshot instead of the first snapshot, and the pulled events are events received and stored in the memory between the second snapshot and the previous time.

7. The apparatus of claim 1, wherein, when a train has completed travel or left the rail system, the processor is further configured to remove any events related to the train from the memory.

8. A method comprising:
receiving a plurality of events related to train movements in a rail system;
creating and storing in memory a first snapshot, according to a specific domain and organized in a partitioned hierarchy of one or more topics related to the rail system or domain, that include the plurality of the events, wherein a number of events in the first snapshot are based on a number of active trains;
receiving a request for a state of the rail system;
pulling the first snapshot from memory and events from memory received after the first snapshot based on the request; and
determining a state of the rail system using the pulled first snapshot and the pulled event, wherein the state of the rail system comprises a plurality of active events of the plurality of events as of a specific time and organized by a plurality of train symbols.

9. The method of claim 8, wherein each event in the plurality of events is a detailed description of a train movement at an indicated time.

10. The method of claim 8, further comprising:
receiving a second plurality of events, and
creating and storing in memory a second snapshot of the second plurality of events based on a number of active trains.

11. The method of claim 10, wherein, when the playback request is a current time, the pulled snapshot is the second snapshot instead of the first snapshot, and the pulled events are received after the second snapshot.

12. The method of claim 10, wherein, when the request is a previous time before the second snapshot and the pulled events are events received between the first snapshot and the previous time.

13. The method of claim 10, wherein, when the request is a time after the second snapshot, the pulled snapshot is the second snapshot instead of the first snapshot, and the pulled events are events received between the second snapshot and the previous time.

14. The method of claim 8, further comprising, when a train has completed travel or left the rail system, removing any events related to the train from a memory.

15. A non-transitory computer-readable medium storing instructions that, when executed, causes a processor to:
receive a plurality of events related to train movements in a rail system,
create and store in memory a first snapshot, according to a specific domain and organized in a partitioned hierarchy of one or more topics related to the rail system or domain, that include the plurality of the events, wherein a number of events in the first snapshot are based on a number of active trains,
receive a request for a state of the rail system,
pull the first snapshot stored in memory and events received and stored in memory after the first snapshot based on the playback request, and
identify a state of the rail system using the pulled first snapshot and the pulled events, wherein the state of the rail system comprises a plurality of active events of the plurality of events as of a specific time and organized by a plurality of train symbols.

16. The non-transitory computer-readable medium of claim 15, wherein each event in the plurality of events is a detailed description of a train movement at an indicated time.

17. The non-transitory computer-readable medium of claim 15, wherein the instructions further cause the processor to:
receive a second plurality of events, and
create and store in memory a second snapshot of the second plurality of events based on a number of active trains.

18. The non-transitory computer-readable medium of claim 17, wherein, when the request is a current time, the pulled snapshot is the second snapshot instead of the first snapshot, and the pulled events are received after the second snapshot.

19. The non-transitory computer-readable medium of claim 17, wherein, when the request is a previous time before the second snapshot, and the pulled events are pulled events are received between the first snapshot and the previous time.

20. The non-transitory computer-readable medium of claim 17, wherein, when the request is a time after the second snapshot, the pulled snapshot is the second snapshot instead of the first snapshot, and the pulled events are events received between the second snapshot and the previous time.

* * * * *